(12) United States Patent
Semprini et al.

(10) Patent No.: US 6,472,198 B1
(45) Date of Patent: Oct. 29, 2002

(54) SLOW RELEASE SUBSTRATES FOR DRIVING MICROBIAL TRANSFORMATIONS OF ENVIRONMENTAL CONTAMINANTS

(75) Inventors: Lewis Semprini; Sanjay Vancheeswaran, both of Corvallis, OR (US)

(73) Assignee: The State of Oregon Acting by and through the State Board of Higher Education on Behalf of Oregon State University, Corvallis, OR (US)

( * ) Notice: Subject to any disclaimer, the term of this patent is extended or adjusted under 35 U.S.C. 154(b) by 0 days.

(21) Appl. No.: 09/311,992

(22) Filed: May 14, 1999

Related U.S. Application Data
(60) Provisional application No. 60/085,690, filed on May 15, 1998.

(51) Int. Cl.[7] .................................................. B09B 3/00
(52) U.S. Cl. .................... 435/262.5; 435/810; 210/601; 210/620
(58) Field of Search .............................. 435/262, 262.5, 435/810; 210/620, 601

(56) References Cited

U.S. PATENT DOCUMENTS

| | | | |
|---|---|---|---|
| 5,277,815 A | | 1/1994 | Beeman ...................... 210/605 |
| 5,340,376 A | | 8/1994 | Cunningham ................... 71/6 |
| 5,427,944 A | | 6/1995 | Lee et al. |
| 5,480,549 A | * | 1/1996 | Looney et al. ............... 210/610 |
| 5,780,290 A | * | 7/1998 | Rosenberg et al. .......... 435/243 |
| 6,258,589 B1 | * | 7/2001 | Dybase et al. ........... 435/262.5 |

OTHER PUBLICATIONS

Vancheeswarin, S., Environ. Sci. and Technol. 1999, 3397, 1077–1085.*
Alvarez–Cohen et al., "Characterization of a Methane–Utilizing Bacterium from a Bacterial Consortium That Rapidly Degrades Trichloroethylene and Chloroform," *Appl. Environ. Microbiol.*, 58(6):1886–1893 (1992).
Aelion et al., "Hydrolysis of Ethyl Silicate," *J. Am. Chem. Soc.*, 72(12):5705–5712 (1951).
Alagar et al., "Studies of Thermal Behaviour of Tetraalkoxysilanes," *Chem. Eng. Comm.*, 80:1–9 (1989).
Alagar et al., "Thermal Properties of Tetraalkoxysilanes," *J. Chem. Tech. Biotechnol.*, 36:577–582 (1986).
Arthur et al., "Automation and Optimization of Solid–Phase Microextraction," *Anal. Chem.*, 64(17):1960–1966 (1992).
Ballapragada et al., "Effect of Hydrogen on Reductive Dechlorination of Chlorinated Ethenes," *Environ. Sci. Technol.*, 31(6):1728–1734 (1997).
DiStefano et al., "Hydrogen as an Electron Donor for Dechlorination of Tetrachloroethene by an Anaerobic Mixed Culture," *Appl. Environ. Microbiol.*, 58(11):3622–3629 (1992).

DiStefano et al., "Reductive Dechlorination of High Concentrations of Tetrachloroethene to Ethene by an Anaerobic Enrichment Culture in the Absence of Methanogenesis," *Appl. Environ. Microbiol.*, 57(8):2287–2292 (1991).
Eaborn, *Organosilicon Compounds*, Buttersworth Publications Limited, Edinburgh, Title page, Publication page, Table of Contents, 4 pgs. (1960).
Fennell et al., "Comparison of Butyric Acid, Ethanol, Lactic Acid, and Propionic Acid as Hydrogen Donors for the Reductive Dechlorination of Tetrachloroethene," *Environ. Sci. Technol.*, 31(3):918–926 (1997).
Fennell et al., "Comparative Studies of Hydrogen Donors for Stimulation of Tetrachloroethene Dechlorination," *In Situ and On–Site Bioremediation*: vol. 3, Allenman et al., Eds., Battelle Press, Columbus, OH, 3:11 (Abstract) (1997).
Freedman et al., "Biological Reductive Dechlorination of Tetrachloroethylene and Trichloroethylene to Ethylene under Methanogenic Conditions," *Appl. Environ. Microbiol.*, 55(9):2144–2151 (1989).
Gibson et al., "Stimulation of Reductive Dechlorination of Tetrachloroethene in Anaerobic Aquifer Microcosms by Addition of Short–Chain Organic Acids or Alcohols," *Appl. Environ. Microbiol.*, 58(4):1392–1393 (1992).
Hasegawa et al., "Influence of the Type of Alkyl Group on Hydrolysis and Polycondensation of Tetraalkoxysilane," *J. Non–Crystalline Solids*, 100:201–205 (1988).
Holliger et al., "A Highly Purified Enrichment Culture Couples the Reductive Dechlorination of Tetrachloroethene to Growth," *Appl. Environ. Microbiol.*, 59(9):2991–2997 (1993).
Hopkins et al., "Microcosm and In Situ Field Studies of Enhanced Biotransformation of Trichloroethylene by Phenol–Utilizing Microorganisms," *Appl. Environ. Microbiol.*, 59(7):2277–2285 (1993).
Hopkins et al., "Trichloroethylene Concentration Effects on Pilot Field–Scale In–Situ Groundwater Bioremediation by Phenol–Oxidizing Microorganisms," *Environ. Sci. Technol.*, 27(12):2542–2547 (1993).
Mars et al., "Degradation of Toluene and Trichloroethylene by *Burkholderia cepacia* G4 in Growth–Limited Fed–Batch Culture," *Appl. Environ. Microbiol.*, 62(3):886–891 (1996).
Maymó–Gatell et al., "Isolation of a Bacterium That Reductively Dechlorinates Tetrachloroethene to Ethene," *Science*, 276:1568–1571 (1997).

(List continued on next page.)

*Primary Examiner*—David A. Redding
(74) *Attorney, Agent, or Firm*—Mueting, Raasch & Gebhardt, P.A.

(57) ABSTRACT

Bioremediation methods and kits for degrading environmental contaminants, such as chlorinated hydrocarbons, in a sample containing microorganisms uses at least one slow release compound having at least one hydrolyzable organic group capable of forming at least one alcohol, at least one organic acid, or a combination thereof, upon hydrolysis. The hydrolysis occurs over an extended period of time to provide alcohols and/or organic acids, which are used by the microorganisms to degrade the environmental contaminants.

51 Claims, 10 Drawing Sheets

OTHER PUBLICATIONS

Maymó–Gatell et al., "Characterization of an $H_2$–Utilizing Enrichment Culture That Reductively Dechlorinates Tetrachloroethene to Vinyl Chloride and Ethene in the Absence of Methanogenesis and Acetogenesis," *Appl. Environ. Microbiol.*, 61(11):3928–3933 (1995).

McCarty et al., "Ground–Water Treatment for Chlorinated Solvents," *Handbook of Bioremediation*, Lewis Publishers Inc., Chelsea, MI, Ch. 5, pp. 87–116 (1994).

McNeil et al., "Kinetics and Mechanism of Hydrolysis of a Silicate Triester, Tris(2–methoxyethoxy)phenysilane," *J. Am. Chem. Soc.*, 102(6):1859–1865 (1980).

Mohn et al., "Microbial Reductive Dehalogenation," *Microbial. Reviews*, 56(3):482–507 (1992).

Pon et al., "An Anaerobic–Aerobic Microcosm Study of PCE and TCE Degradation by Microbes Stimulated from a Contaminated Site," *In Situ and On–Site Bioremedation*, Papers from Fourth International In Situ and On–Site Bioremediation Symposium, New Orleans, Apr. 28–May 1, 3:247–252 (1997).

Semprini, "In Situ Bioremediation of Chlorinated Solvents," *Environ. Health Pers.*, 103(Supp. 5):101–105 (1995).

Semprini, "In Situ Transformation of Halogenated Aliphatic Compounds Under Anaerobic Conditions," *Subsurface Restoration*, Ward et al., Eds., Ann Arbor Press, Inc., Chelsea, MI, Ch. 26, pp. 429–448 (1997).

Semprini, "Strategies for the Aerobic Co–Metabolism of Chlorinated Solvents," *Curr. Opin. in Biotech.*, 8:296–308 (1997).

Smatlak et al., "Comparative Kinetics of Hydrogen Utilization for Reductive Dechlorination of Tetrachloroethene and Methanogenesis in an Anaerobic Enrichment Culture," *Environ. Sci. Technol.*, 30(9):2850–2858 (1996).

Thauer et al., "Energy Conservation in Chemotrophic Anaerobic Bacteria," *Bacteriol. Rev.*, 41(1):100–180 (1977).

Vancheeswaran et al., "Anaerobic transformation of TCE driven by organo–silicon compounds," Abstract 129:306037b, *Chemical Abstracts*, 129(23):901–902 (1998).

Zhang et al., "Solid–Phase Microextraction," *Anal. Chem.*, 66(17):844A–853A (1994).

* cited by examiner

SLOW RELEASE SUBSTRATES FOR DRIVING MICROBIAL TRANSFORMATIONS OF ENVIRONMENTAL CONTAMINANTS

RELATED APPLICATIONS

This application claims the benefit of U.S. Provisional Application No. 60/085,690, filed May 15, 1998.

BACKGROUND OF THE INVENTION

Trichloroethylene (TCE) is widely used as a solvent and a degreasing agent. It has been spilled in the environment and causes great concern because of its toxicity and possible carcinogenic properties. No microorganisms that can grow on this compound as an electron donor are known, but cometabolic conversion of TCE induced by oxygenases has been extensively studied. Several compounds like phenol, toluene, methane, propane, and butane have been demonstrated to produce enzymes that cometabolize TCE. Some of these compounds have been shown to induce the corresponding monooxygenase enzymes that are responsible for the oxidation of the TCE.

Similarly, cis-dichloroethylene (cis-DCE), which is frequently the anaerobic transformation product of TCE, accumulates in the environment and poses an equally important health hazard. The aerobic cometabolism of cis-DCE has been reported to occur with many microorganisms that also degrade TCE. The pathways of degradation for both cis-DCE and TCE are similar.

The aerobic organisms that are capable of oxidizing cis-DCE and TCE possess an oxygenase enzyme for the initial oxidation with growth substrates such as methane and propane, for example. The mechanism of monooxygenase catalyzed oxidation of cis-DCE and TCE is presented in Schemes 1 and 2, respectively.

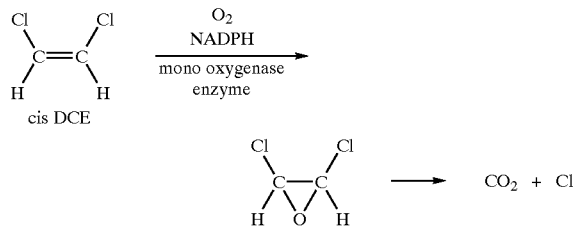

Scheme 1
Proposed Oxidative Dechlorination Mechanism for cis-DCE

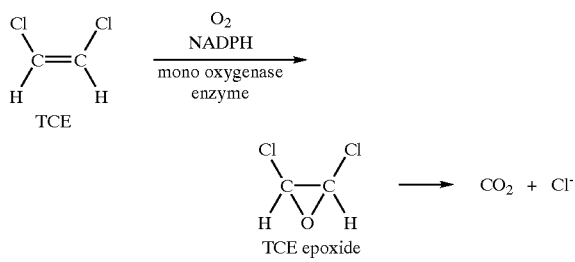

Scheme 2
Proposed Oxidative Dechlorination Mechanism for TCE

The oxidative dechlorination of cis-DCE and TCE requires nicotinamide adenine dinucleotide hydrogen phosphate (NADPH) as the reducing energy source and molecular oxygen as an electron acceptor. The oxidation of the chlorinated ethenes causes the depletion of NADPH in cells. Therefore, NADPH has to be supplied via cometabolic substrate oxidation and endogenous energy reserves. The oxidation of cis-DCE and TCE lead to the formation of the corresponding epoxides, which are highly unstable with half lives of 70 hours to a few seconds, respectively.

Most chlorinated ethenes cannot be utilized as the primary substrate for growth by aerobes, but can be reductively dechlorinated by natural microbial communities and mixed microbial enrichment cultures under anaerobic conditions. For example, the reductive dechlorination of TCE occurs via cis-dichloroethylene (cis-DCE) and vinyl chloride (VC) to ethene by the sequential replacement of the chlorine atoms with hydrogen.

The chlorinated ethenes serve as the electron acceptors in reductive dechlorination. Each dechlorination step requires two electrons, and therefore an electron donor is necessary to complete the reaction. A number of organic compounds have been successfully used as electron donors for the anaerobic dechlorination of TCE. TCE has been shown to be converted to cis-DCE with additions of lactate, propionate, crotonate, butyrate, or ethanol as an electron donor in soil microcosms. Other electron donors such as acetate, glucose, formate, and methanol have also proved to be effective.

Even though a wide range of electron donors support dechlorination, recent studies have shown that the hydrogen produced from the fermentation of these electron donors may be the ultimate electron donor. Cultures enriched with methanol have been shown to dechlorinate using hydrogen as the sole electron donor. Also, it has been shown that a strain of bacteria can grow on tetrachloroethylene (PCE) and hydrogen to produce ethylene. See, for example, DiStefano et al., *Appl. Environ. Microbiol.*, 57, 2287–2292 (1991); Holliger et al., *Appl. Environ. Microbiol.*, 59, 2991–2997 (1993); DiStefano et al., *Appl. Environ. Microbiol.*, 58, 3622–3629 (1992); Maymo-Gatell et al., *Appl. Environ. Microbiol.*, 3928–3933 (1995); Mohn et al., *Microbial Reviews*, 56, 482–507 (1992); Maymo-Gatell et al., *Science*, 276, 1568–1571 (1997); and Fennell et al., *Environ. Sci. Technol.*, 31, 918–926 (1997). Even though $H_2$ is not always the only electron donor, it is in many cases the electron donor used by dechlorinators. In natural environments, most $H_2$ becomes available to hydrogenotrophic microorganisms through the fermentation of more complex substrates by other members of the microbial consortium. The dechlorinators then face severe competition from other microorganisms such as sulfate reducers and methanogens for the evolved $H_2$.

Recent work on the anaerobic transformation of chlorinated solvents such as PCE and TCE has centered on determining what substrates can be slowly fermented to deliver a long term source of hydrogen. The goal is to maintain a constant delivery of low concentration of hydrogen, so that the hydrogen is directed towards the dehalogenation process, and not the competing reaction of carbon dioxide with hydrogen to form methane. Thus, the use of slow release substrates hold enormous promise for the implementation of this technology.

Another potential use of slow release substrates is to deliver aerobic substrates to drive the cometabolism of chlorinated solvents. For example, phenol has been demonstrated to be an effective substrate to drive the aerobic cometabolism of TCE; however, direct addition of phenol is problematic because it is a regulated compound and phenol competitively inhibits the enzyme required for TCE cometabolism.

Anaerobic dehalogenation processes are also important for the treatment of chlorinated phenols, such as pentachlorophenol and polychlorinated biphenyls (PCBs). Thus, there is a need for substrates that slowly release compounds that can promote aerobic and/or anaerobic dehalogenation of environmental contaminants, particularly halogenated organic compounds.

SUMMARY OF THE INVENTION

The present invention provides a bioremediation method of degrading one or more environmental contaminants in a sample containing microorganisms. In one embodiment, the method includes: determining the presence of the one or more environmental contaminants; and contacting the sample with at least one slow release compound having at least one hydrolyzable organic group capable of forming at least one alcohol, at least one organic acid, or a combination thereof, upon hydrolysis; wherein the slow release compound having at least one hydrolyzable organic group is provided in an amount sufficient to form at least one alcohol, at least one organic acid, or a combination thereof, in an amount sufficient for the microorganisms to degrade the one or more environmental contaminants.

Preferably, determining the presence of one or more environmental contaminants includes measuring the initial concentration of a contaminant and monitoring its degradation into transformation products. Preferably, monitoring degradation of an environmental contaminant includes measuring its concentration or the concentration of its transformation products during the degradation of the environmental contaminant.

In another embodiment, the present invention provides a bioremediation method of degrading a halogenated organic compound in an environmental sample. The method includes: determining the presence of the halogenated organic compound; and contacting the environmental sample with at least one organosilicon compound having at least one hydrolyzable organic group in the presence of at least one type of microorganism.

The environmental contaminant can be selected from the group of organic compounds (e.g., halogenated organic compounds, polycyclic aromatic hydrocarbons, and nitrogenated organic compounds), metals, metal-containing compounds, and mixtures thereof. The compound having at least one hydrolyzable organic group is selected from the group of an organometallic compound, an organophosphorus compound, an organic compound, and mixtures thereof. The bioremediation method can occur under aerobic conditions, anaerobic conditions, or a combination of anaerobic and aerobic conditions. Thus, the microorganisms can be aerobic or anaerobic microorganisms.

The sample containing one or more environmental contaminants can include soil, sediment, sludge, water, or combinations thereof, and the bioremediation method can be carried out in situ. Thus, if the sample is in a subsurface environment, such as groundwater, the contacting step can include injecting a liquid into the subsurface environment using, for example, drive-point devices. Alternatively, recirculation wells can be used. If desired, the sample can be treated ex situ in a bioreactor, for example.

The present invention also provides a kit for bioremediation of an environmental contaminant in a sample comprising at least one type of microorganism. The kit includes: at least one slow release compound having at least one hydrolyzable organic group capable of forming at least one alcohol, at least one organic acid, or a combination thereof, upon hydrolysis; and instruction means for applying the compound to the sample. Preferably, the kit includes a container that allows slow release of the compound having at least one hydrolyzable organic group, the alcohol or organic acid, or combinations thereof.

DETAILED DESCRIPTION OF THE PREFERRED EMBODIMENTS

Figure 1:
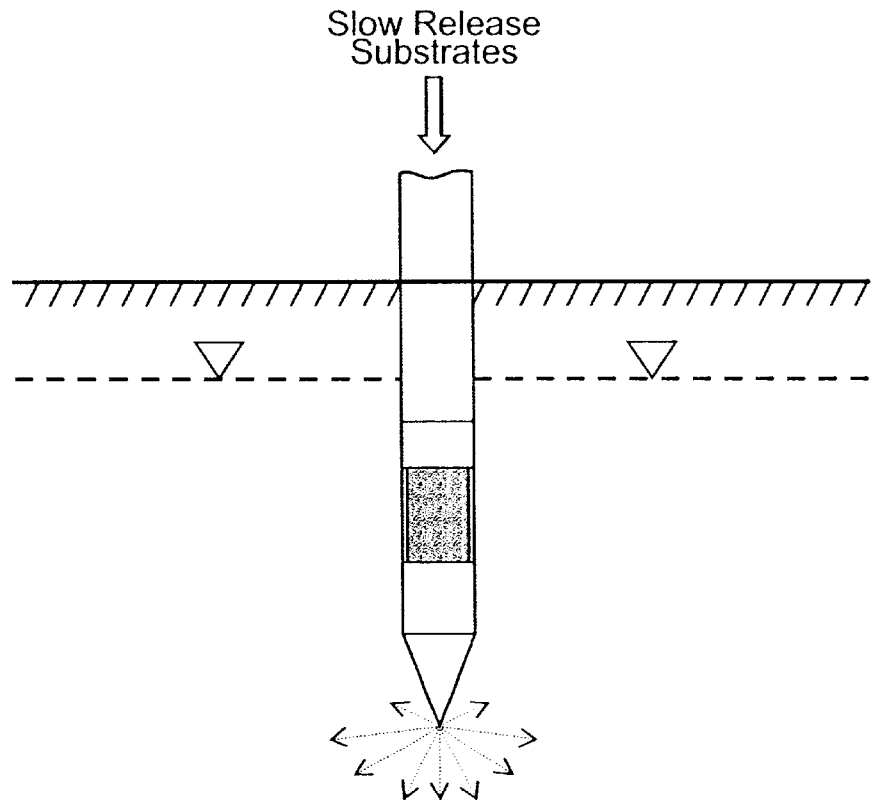
FIG. 1 is a representation of a cone penetrometer method for adding slow release substrates to a contaminated site.

The present invention provides bioremediation methods and kits for degrading environmental contaminants, such as chlorinated hydrocarbons, in a sample of soil, sediment, sludge, water, or combinations thereof. The sample can be treated in situ (i.e., while in place) or ex situ (e.g., in a bioreactor). For example, the sample containing an environmental contaminant can include subsurface water or soil, which can be treated either in situ or ex situ. A contaminated sample (e.g., a contaminated in situ site) typically includes one or more types of microorganisms that degrade the contaminants when supplied with the appropriate substrates. Alternatively, however, such microorganisms can be added to the sample.

These methods and kits use at least one slow release compound having at least one hydrolyzable organic group capable of forming at least one alcohol, at least one organic acid, or a combination thereof, upon hydrolysis (i.e., reaction with water). The hydrolysis products (alcohols and/or acids) are used by microorganisms in metabolic processes that degrade a wide variety of environmental contaminants. Although not intended to be limiting, it is believed that the hydrolysis products provide electrons to stimulate degradation of environmental contaminants by microorganisms (e.g., indigenous bacteria).

The hydrolysis occurs over an extended period of time to provide alcohols and/or organic acids, which are used by the microorganisms to degrade the environmental contaminants. As used herein, an extended period of time refers to a macroscopically measurable amount of time, which is longer than instantaneous, during which hydrolysis occurs substantially completely upon contact with water. Typically, the hydrolysis occurs over a period of at least about one day, preferably, at least about one week, and more preferably, over a period of at least one month or longer. Thus, these compounds are referred to herein as "sustained release" or "slow release" compounds or substrates.

As used herein, slow release compounds have a half-life of hydrolysis of at least about 24 hours, preferably, at least about one week, and more preferably, at least about one month. Typically, this is because they are only slightly soluble in water. Preferably, the slow release compounds have a solubility at 25° C. in water of less than about 2000 mg/L, more preferably, less than about 1000 mg/L in water, and most preferably, less than about 100 mg/L. Such compounds form alcohols and/or organic acids upon hydrolysis. Depending on the pH of the sample, the organic acid may be in its protonated form or nonprotonated form.

The methods involve identifying a site containing one or more environmental contaminants. Typically, such sites include indigenous microorganisms of the appropriate type that can degrade the environmental contaminants given substrates (e.g., alcohols and/or organic acids) they can utilize for growth. If not, however, the appropriate microorganisms can be added. The bioremediation method can be monitored by measuring the initial concentration of a contaminant and monitoring its degradation into transformation products. This latter step can be accomplished by measuring the decrease in concentration of the contaminant of interest and/or the increase in concentration or partial pressure of its transformation products during the degradation of the environmental contaminant.

The bioremediation methods of the present invention degrade a wide variety of environmental contaminants that are considered hazardous or undesirable, particularly to humans, for one or more reasons, such as organic solvents, pesticides, explosives, etc. Such contaminants include, for example, organic compounds such as halogenated (i.e., halogen-containing) organic compounds, polycyclic aromatic hydrocarbons, and nitrogenated (i.e., nitrogen-containing) organic compounds, as well as metals, metal-containing compounds (e.g., organometallic compounds), and mixtures thereof. The halogenated and nitrogenated organic compounds include aromatic, aliphatic, and/or alicyclic groups, which may be unsubsituted or substituted with groups other than halides or nitrogen-containing groups. The aliphatic and alicyclic groups may be saturated or unsaturated. The aliphatic groups may be branched or linear. The polycyclic aromatic hydrocarbons may be substituted or unsubstituted, but typically are unsubstituted.

Typically, the nitrogenated organic compounds include nitroaromatic compounds, such as 2,4,6-trinitrotoluene, dinitrotoluene, and dinitrobenzene, for example. Typically, the halogenated organic compounds include chlorinated hydrocarbons, fluorinated hydrocarbons, chlorofluoro hydrocarbons, or mixtures thereof. Specific examples include cis-dichloroethene, vinyl chloride, trichloroethene, tetrachloroethene, and trichlorofluoroethylene.

The transformation products typically include less hazardous, preferably innocuous, compounds and ions. For example, for the halogenated contaminants, the transformation products typically include less hazardous (and generally innocuous) organic compounds such as ethane and ethene, salts such as chloride salts and fluoride salts, as well as carbon dioxide, hydrogen, and water. If the contaminant is a metal or metal-containing compound, the metal can be reduced to produce a less mobile, and hence, less problematic metal or metal-containing compound (e.g., $Cr^{6+}$ compounds can be converted to the less mobile $Cr^{3+}$ compounds).

The bioremediation methods of the present invention can occur under aerobic conditions, anaerobic conditions, or a combination of anaerobic and aerobic conditions. For example, anaerobic conditions can be used to initiate the degradation process, which can be driven further under aerobic conditions, as is disclosed in U.S. Pat. No. 5,277,815 (Beeman). Thus, the microorganisms that use the hydrolysis products to degrade the environmental contaminants can be aerobic or anaerobic. A wide variety of such microorganisms can be used.

Typically and preferably, the anaerobic microorganisms are bacteria such as methanogens, acetogens, dehalogenators, denitrifiers, and mixtures thereof. Dehalogenating bacteria include, for example, iron reducers, sulfate reducers, manganate reducers, and mixtures thereof. One of skill in the art can readily select specific examples of suitable bacteria. Typically, the aerobic microorganisms are bacteria that produce or induce enzymes such as monooxygenases, dioxygenases, hydrolases, and mixtures thereof. Examples of monooxygenases include methane monooxygenases, propane monooxygenases, butane monooxygenases, and mixtures thereof. One of skill in the art can readily select specific examples of such bacteria.

Preferably, if hydrogen is needed for the bioremediation process, at least one of the anaerobic microorganisms produces hydrogen. One of skill in the art can readily select such microorganisms. Alternatively, hydrogen can be provided to the sample containing the contaminants using an external hydrogen source, such as by pumping hydrogen into the sample.

If desired, nutrients, such as phosphorus- and nitrogen-containing compounds, can be provided to the sample containing the contaminants to support microbial activity. Such nutrients can be added to the sample as separate compounds or they can be engineered into the compound having at least one hydrolyzable organic group.

The compound having at least one hydrolyzable organic group can be one of a wide variety of compounds that form alcohols, acids, or combinations thereof, upon reaction with water. Such compounds include, for example, organometallic compounds, organophosphorus compounds, and organic compounds. Examples of suitable organophosphorus compounds include trialkyl phosphates and triaryl phosphates such as tributyl phosphate and triphenyl phosphate. Examples of suitable organic compounds include carboxylic acid esters, such as those of the formula $(C_nH_{2n+1})C(O)OC_6H_5$, including, for example, phenyl acetate, phenyl propionate, phenyl butyrate, phenyl crotonoate, phenyl lactate, and phenyl pyruvate, and alkyl phthalates of the formula $C_6H_5C(O)O(C_nH_{2n+1})$.

Preferably, the compound having at least one hydrolyzable organic group is an organometallic compound, which includes metal or metalloid centers such as silicon, germanium, tin, and titanium, for example. More preferably, the organometallic compound has the formula $MR_x(OR)_y$ wherein x+y equal the valence of the metal or metalloid (preferably, x=0–3 and y=1–4), and R can be any organic group containing aromatic, aliphatic, and/or alicyclic moieties, which may be unsubsituted or substituted. The aliphatic and alicyclic groups may be saturated or unsaturated. The aliphatic groups may be branched or linear. Preferably, R includes up to 10 carbon atoms. A particularly preferred class of such compounds include organosilicon compounds, such as organosilanes and organosiloxanes. Preferably, the organosilanes are alkoxysilanes having the general formulas, $Si(OR)_4$, $RSi(OR)_3$, $R_2Si(OR)_2$, and $R_3Si(OR)$, disilanes of the formula $(OR)_3$—Si—Si—$(OR)_3$, disiloxanes of the formula $(OR)_3$—Si—O—Si—$(OR)_3$, trisiloxanes, and the like, wherein R can be any organic group containing aliphatic, alicyclic, and/or aromatic moieties. Preferably, R is a C1 to C8 branched or straight chain alkyl group. Tables 1 and 2 include specific examples of suitable organosilicon compounds for use in the bioremediation methods of the present invention.

TABLE 1

Lists of Organosilanes

| No. | Compound Name | Formula | Physical form | Hydrolysis rate | Hydrolysis Product | Manufacturer |
|---|---|---|---|---|---|---|
| 1 | Tetrapropoxysilane | $C_{12}H_{28}O_4Si$ | Liquid | Slow | 1-propanol | Gelest, Huls |
| 2 | Tetrabutoxysilane | $C_{16}H_{36}O_4Si$ | Liquid | Slow | 1-butanol | Gelest, Huls |
| 3 | Tetrakis(2-ethylbutoxy) silane | $C_{24}H_{52}O_4Si$ | Liquid | Very Slow | 2-ethyl butanol | Huls |
| 4 | Tetraphenoxysilane | $C_{20}H_{20}O_4Si$ | Solid | Very Fast | phenol | Gelest, Huls |
| 5 | Silicon tetraacetate | $C_8H_{12}O_8Si$ | Solid | Very Fast | acetate* | Gelest, Huls |
| 6 | Silicon tetrapropionate | $C_{12}H_{20}O_8Si$ | | Fast | propionate | N.C.A. |
| 7 | Silicon tetrabutyrate | $C_{16}H_{28}O_8Si$ | | Fast | butyrate | N.C.A. |
| 8 | Silicon tetralactate | $C_{12}H_{16}O_{12}Si$ | | | lactate | N.C.A. |
| 9 | Silicon tetrabenzoate | $C_{28}H_{20}O_8Si$ | | | benzoate | N.C.A. |
| 10 | Silicon tetracrotonoate | $C_{16}H_{20}O_8Si$ | | | crotonoate | N.C.A. |
| 11 | Tetraallyloxy silane | $C_{12}H_{20}O_4Si$ | Liquid | Slow | 2-propenol | Gelest, Huls |
| 12 | Silicon tetrapyruvate | $C_{12}H_{12}O_{12}Si$ | | | pyruvate | N.C.A. |
| 13 | Tetrakis(2-methylbutoxy) silane | $C_{20}H_{44}O_4Si$ | | Very Slow | 2-methyl butanol | N.C.A. |
| 14 | Tetrakis(1-methylpropoxy) silane | $C_{16}H_{36}O_4Si$ | | Slow | 1-methyl propanol | N.C.A. |
| 15 | Tetrakis(2-methylpropoxy) silane | $C_{16}H_{36}O_4Si$ | | Slow | 2-methyl propanol | N.C.A. |
| 16 | Tetrakis(benzylmethoxy) silane | $C_{28}H_{32}O_4Si$ | | Fast | benzyl alcohol | |
| 17 | Tetrakis(1-hydroxypropoxy) silane | $C_{12}H_{32}O_8Si$ | | Fast | 1,2-propanediol | |
| 18 | Tetrakis(1-methylethoxy) silane | $C_{12}H_{28}O_4Si$ | | Slow | 2-propanol | N.C.A. |

Rates approximately based on half lives which can be categorized as: Slow - 1 month, Very Slow - Several months, Very Fast - days, Fast - weeks
(N.C.A.-Not Commercially Available)
*Organic acids exist in their nonprotonated form at high pH's (typically, above 5)

TABLE 2

List of Organosiloxanes

| No. | Compound Name | Formula | Physical form | Hydrolysis rate | Hydrolysis Product | Manufacturer |
|---|---|---|---|---|---|---|
| 19 | Hexaethoxydisiloxane | $C_{12}H_{30}O_7Si_2$ | | Slow | ethanol | N.C.A. |
| 20 | Hexapropoxydisiloxane | $C_{18}H_{42}O_7Si_2$ | | Slow | 1-propanol | N.C.A. |
| 21 | Hexabutoxydisiloxane | $C_{24}H_{54}O_7Si_2$ | | Slow | 1-butanol | N.C.A. |
| 22 | Hexaphenoxydisiloxane | $C_{36}H_{30}O_7Si_2$ | | Slow | phenol | N.C.A. |
| 23 | Octaethoxytrisiloxane | $C_{16}H_{40}O_{10}Si_3$ | | Slow | ethanol | N.C.A. |

The hydrolysis of alkoxysilanes to the corresponding alcohol is a known reaction with the proposed mechanism shown in Scheme 3.

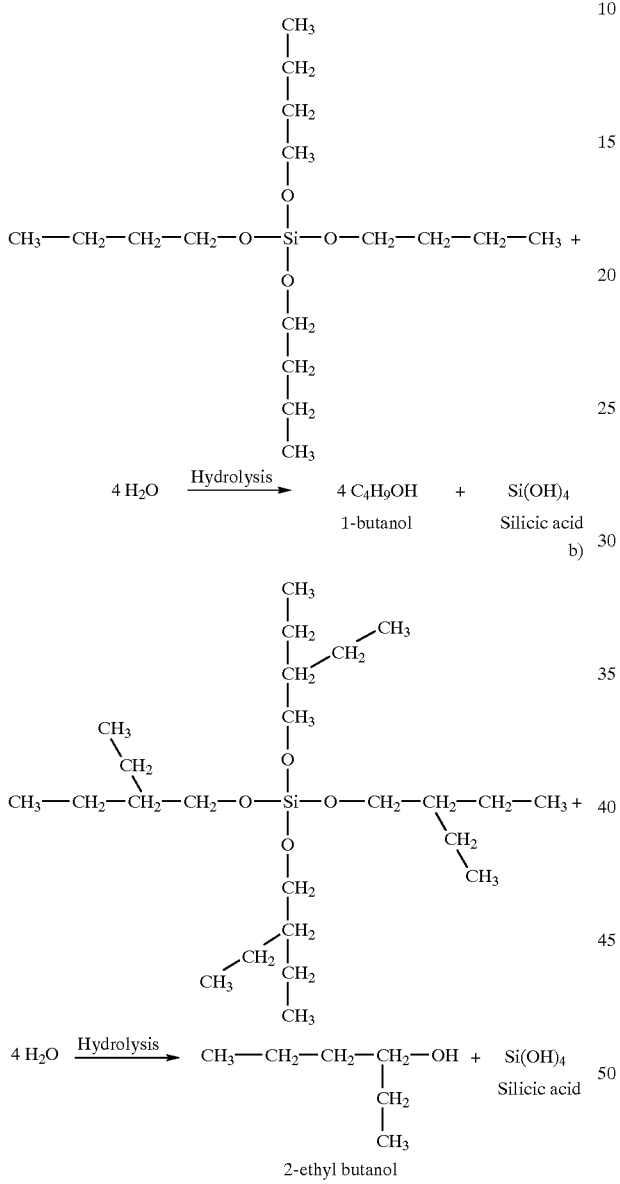

At high molar ratios of the alkoxysilane and water, polycondensation products begin to form as hydrolysis progresses. These polymerization products grow in molecular weight until most of the alkoxy groups are removed and a non-linear network of Si—O—Si gels out. Thus, alkoxysilanes are preferred compounds for use in the present invention. The hydrolysis process is usually considered to be an equilibrium reaction and plays a significant role when the hydrolysis products are soluble.

Depending on the substituted group, the rate that the alcohols or acids are released can be controlled by the rate of hydrolysis. The rate of hydrolysis typically depends on the substituted organic group (i.e., substituent). For example, the rate of hydrolysis decreases as the chain length of the substituent increases. General trends in hydrolysis rates indicate a correlation to the steric bulk of the alkoxy group: $CH_3O > C_2H_5O > C_3H_7O > C_4H_9O >$ branched alkoxy groups like the 2-ethylbutyl group. Thus, different groups can be substituted to release mixtures of alcohols with designed rates of hydrolysis. For example, tetrapropylorthosilicate, which would release propanol into solution, would hydrolyze faster than tetrabutyl orthosilicate (TBOS). The silicates substituted with ethyl and methyl groups, which would deliver ethanol and methanol into solution, would hydrolyze even faster. Methanol, ethanol, propanol, and butanol are all effective substrates to drive anaerobic microbial reductions.

Alkoxysilanes are commercially available or they can be synthesized via the Von Ebelman's synthesis. This involves the reaction of stoichiometric quantities of silicon tetrachloride ($SiCl_4$) with the corresponding alcohol. The reaction is carried out in benzene solvent in the presence of pyridine as an acid acceptor. The hydrogen chloride produced during the reaction is neutralized by the pyridine added to form pyridinium chloride. A slight excess of the alcohol is added to avoid the formation of trialkoxy and lower substituted silanes. After the reaction is completed, the solid pyridinium chloride is filtered out and the filtrate is vacuum distilled to obtain greater than 95% purity tetraalkoxysilane.

Significantly, bioremediation studies using this type of compound have shown slow rates of release. For example, TBOS has been shown to hydrolyze to 1-butanol over a two month period. Also, tetraphenol orthosilicate (TPOS) has been shown to hydrolzye to phenol over a period of weeks. These alcohols can then be used by the microorganisms to cometabolize halogenated organics, such as TCE, for example. As discussed in the Examples below, the decrease in TBOS in a poisoned (killed) control compared similarly to the nonpoisoned (live) microbially active system under anaerobic conditions. Microbial activity was indicated by the production of acetate, butanol, butyrate, and hydrogen in the live microcosms, and the lack of production in the poisoned control. Since the decrease in TBOS concentration was slower in the poisoned control compared to the live system, the results indicate that the products of the decomposition of TBOS were being utilized for microbial growth and not the parent compound. Thus, TBOS is not directly degraded, but is first hydrolyzed by reactions with water to form 1-butanol, which can then be used to drive the aerobic cometabolism of chlorinated organics.

This slow release process can also be used for the delivery of substrates, such as alcohols, to drive the anaerobic transformation of environmental contaminants through microbial reduction. Recent work on the anaerobic transformation of chlorinated solvents such as PCE and TCE has centered on determining what substrates can be slowly fermented to deliver a long term source of hydrogen, since providing the slow delivery of hydrogen at low concentrations is what drives the anaerobic reductions. The bioremediation methods of the present invention can be used to maintain a constant, low concentration of hydrogen (e.g., $4 \times 10^{-4}$ atm), so that the hydrogen is directed towards the dehalogenation process, and not the competing reaction of carbon dioxide with hydrogen to form methane.

The slow release substrates described herein can be used in the bioremediation methods of the present invention as liquids or solids. They can be mixed with water to form colloidal dispersions (i.e., an aqueous dispersion of colloidal particles), for example. They can be chemically bonded to, or physically adsorbed to, a solid support, such as supports having surface OH groups. Alternatively, they can be encapsulated in an organic polymeric material, such as a semipermeable material.

The slow release substrates can be used in any amount desired. Typically, they are used in an amount effective to provide effective amounts of hydrolysis products to stimulate degradation of the environmental contaminants by the microorganisms. If sulfates and nitrates are present in the sample, higher amounts of slow release substrates may be needed to overcome competitive reactions.

Typically and preferably, the bioremediation methods of the present invention are carried out under ambient conditions, although a wider range of temperatures can be used. Typically, a controlling factor for determining the appropriate temperature and pH, for example, is the viability of the microorganisms. Preferably, the temperature is within a range of about 0° C. to about 100° C., and the pH is about 4 to about 9.

The slow release substrates can be applied to many different types of in situ (e.g., in a surface or subsurface environment) and ex situ (e.g., in a bioreactor) remediation systems. For example, liquid slow release substrates can be directly injected into a site (e.g., groundwater or soil) using drive-point devices, such as cone penetrometers, as shown in FIG. 1. When a contaminated zone is encountered, the liquid slow release substrates can be injected at the desired depth into the subsurface. This method of addition relies on the ability to inject fluid using one or more cone penetrometers (or similar technology) without the installation of wells. The liquid would then radiate out from the point of injection.

Figure 2:
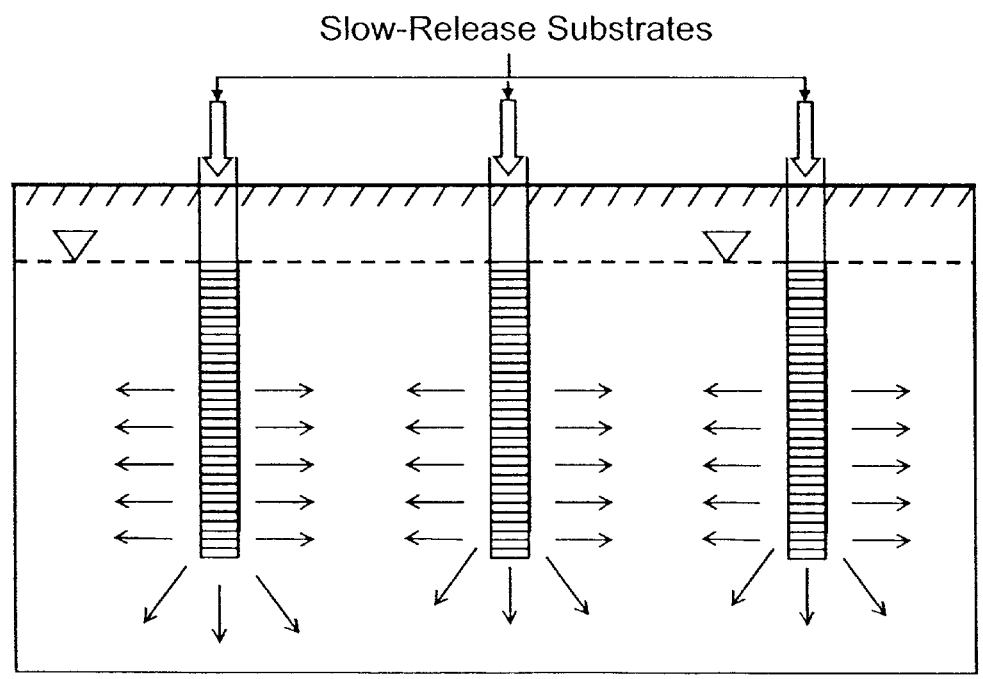
FIG. 2 is a representation of a multi-well method for injecting slow-release substrates to create a passive barrier.

Alternatively, liquid slow release substrates can be directly injected as colloidal dispersions into subsurface aquifers, soils, or sediments using wells. In this embodiment, colloidal dispersions would be added so that they radiate out from the well and are transported through porous soil, for example, adjacent injection well screens. A series of wells can be used to create an extended zone of slow release substrate for treatment of the subsurface site, as shown in FIG. 2.

Figure 3:
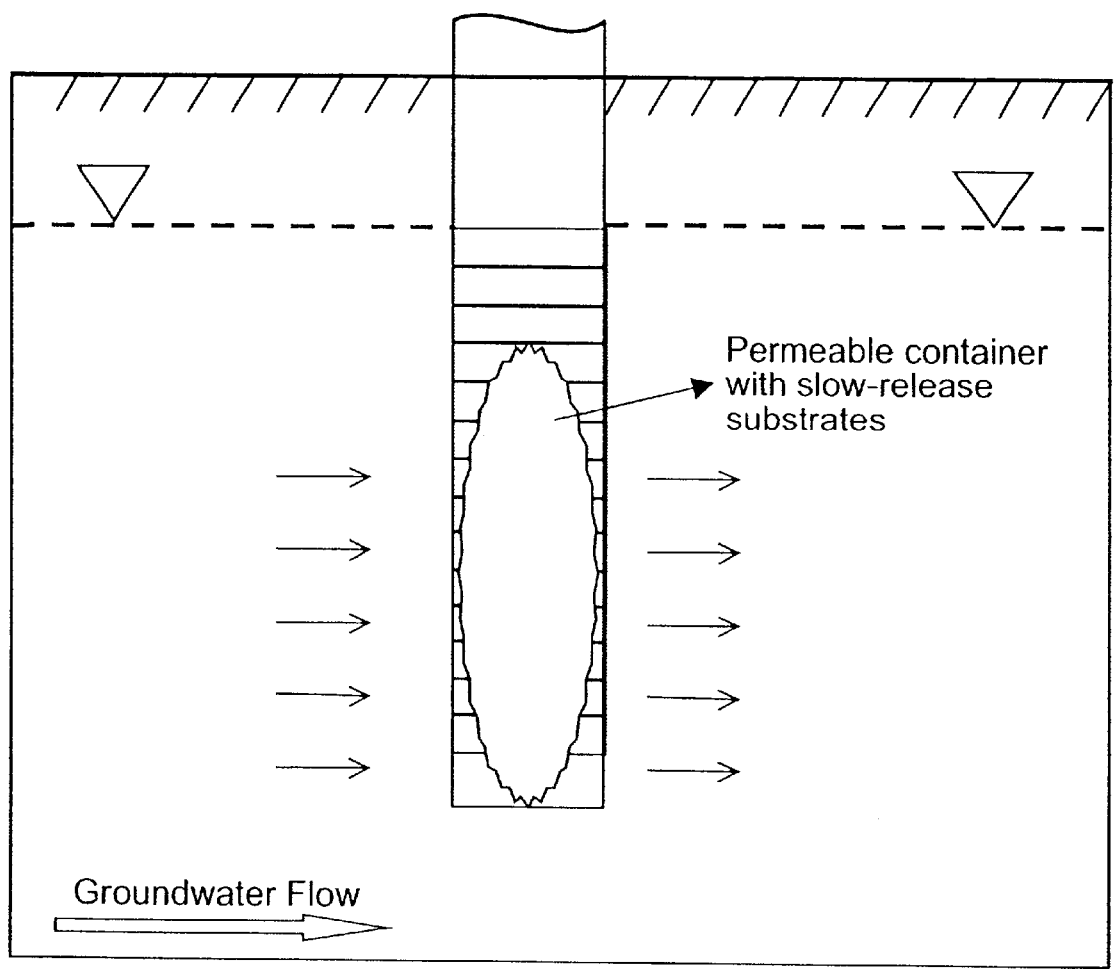
FIG. 3 is a representation of a permeable container for adding slow release substrates to wells.

The slow release substrates could also be placed within wells in a container that permits the substrate to slowly react with water and/or release the slow release substrate and/or the hydrolysis products to the well, as shown in FIG. 3. The container could be made of a permeable material, such as a hydrophobic polymer membrane, that allows for selective diffusion of the hydrolysis products. This method would work for both liquid and solid substrates.

Figure 4:
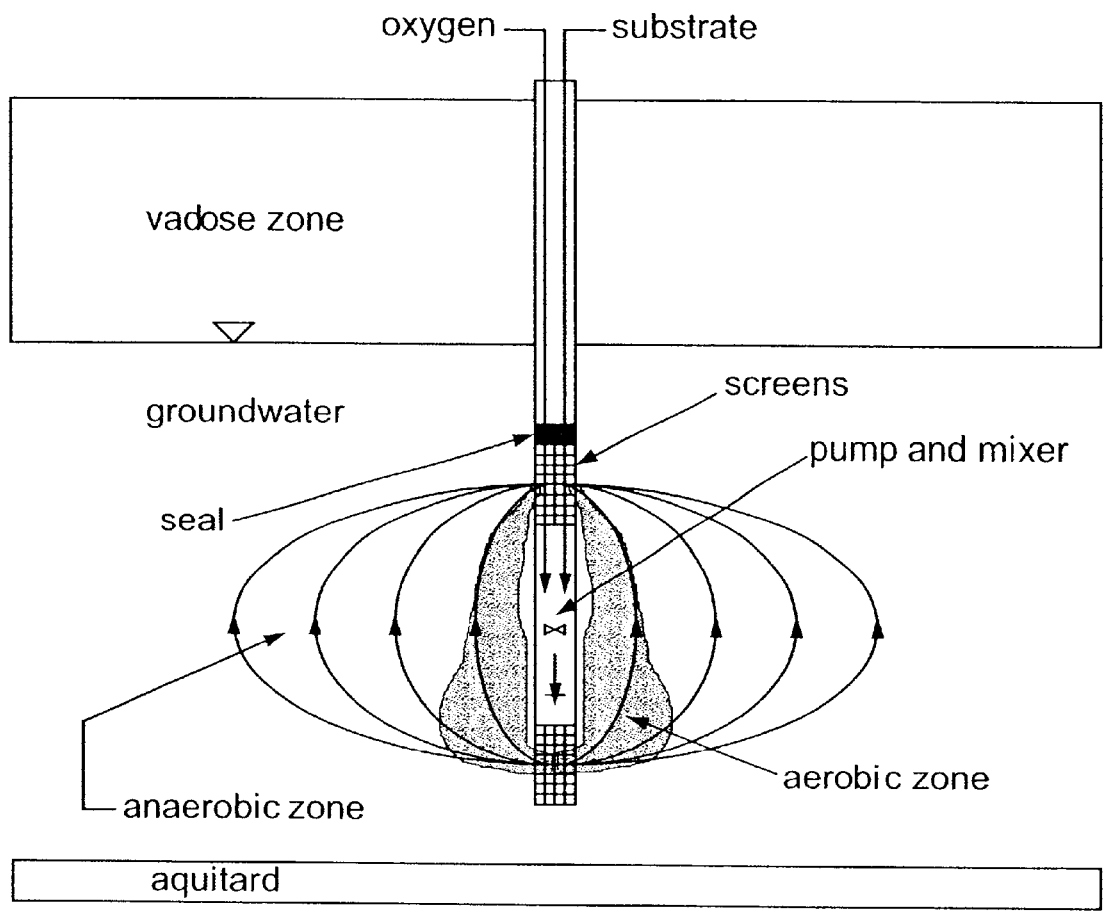
FIG. 4 is a representation of a recirculation well for the addition of slow release substrates in a dual aerobic/anaerobic system.

Yet another approach would be to add liquid slow release substrates to recirculation wells such as that shown in FIG. 4. A liquid slow release substrate would be injected into a recirculation well and a pump in between would be used to recirculate water between the well screens. The system shown in FIG. 4 is for a dual aerobic/anaerobic system. The container shown in FIG. 3 could also be used in this embodiment.

Figure 5:
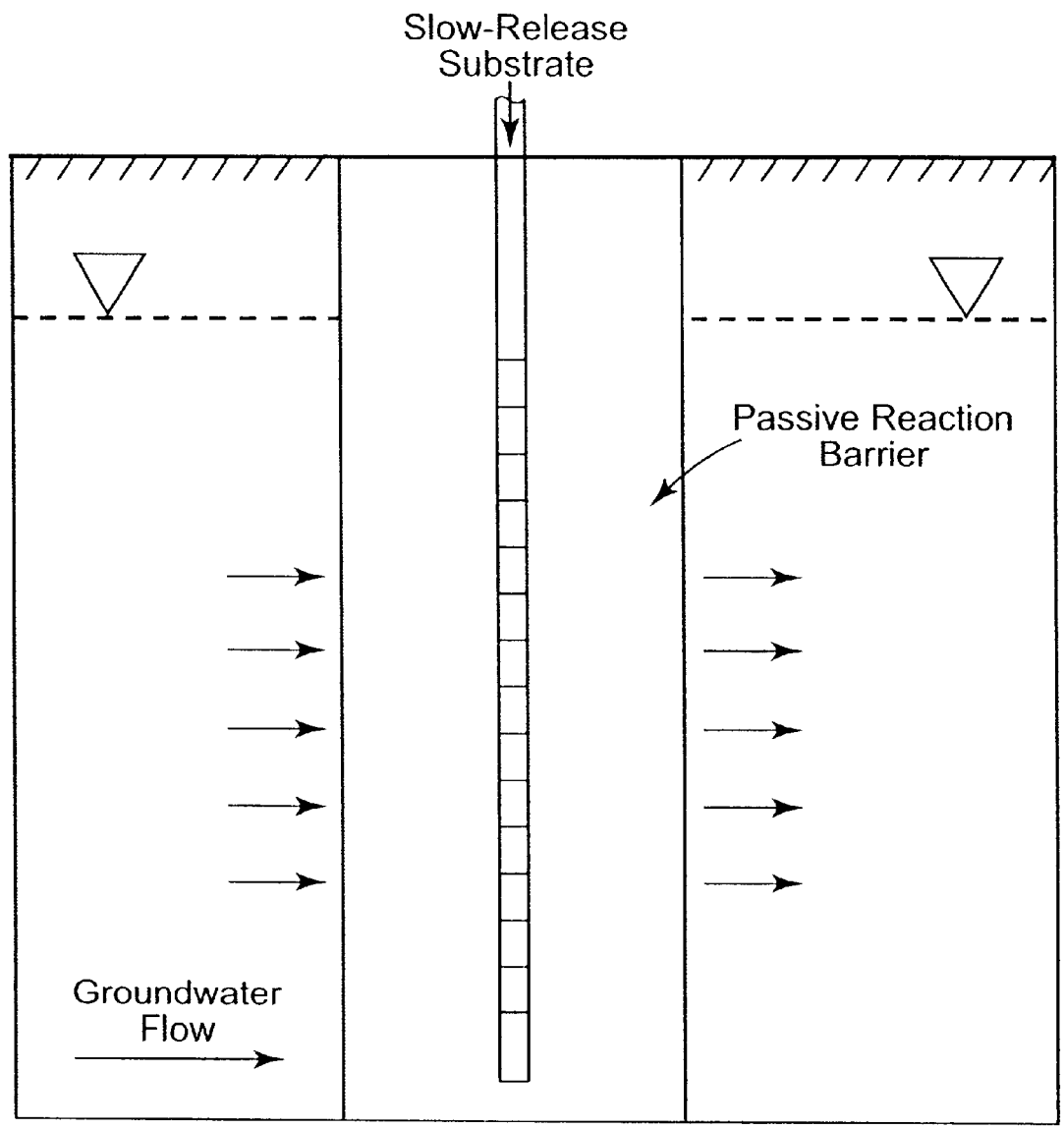
FIG. 5 is a representation of a passive reaction barrier into which slow release substrates can be injected.

Another approach would be to add a slow release substrate to a passive reaction barrier constructed through which groundwater is funneled. The passive reaction barrier is a highly permeable zone. It could include gravel or other porous material through which the groundwater could flow. A slow release substrate would be injected into one or more wells in the passive barrier, as shown in FIG. 5.

The slow release substrates can also be added to above ground treatment systems, such as soil piles, and compost piles by directly mixing the substrates into the soil and compost piles. Groundwater could be treated using a series of extraction and injection wells. Both solid and liquid substrates could be added in these systems.

The substrates can also be directly added to engineered bioreactor systems, such as fluidized bed reactors, plug flow reactors, batch sequencing reactors, completely stirred tank reactors, granular activated sludge reactors, and combinations thereof, and other types of reactor systems that have been developed to promote biological transformations of organic and inorganic contaminants.

Objects and advantages of this invention are further illustrated by the following examples, but the particular materials and amounts thereof recited in these examples, as well as other conditions and details, should not be construed to unduly limit this invention.

EXPERIMENTAL EXAMPLES

Materials and Methods

Trichloroethylene (TCE) (99.9% purity), cis-1,2-dichloroethylene (99.9%), HPLC-grade dichloromethane, 1-butanol (99.9%), 2-ethylbutyl alcohol (96% purity) were obtained from Aldrich Chemical Co. (Milwaukee, Wis.). Tetrabutoxysilane (TBOS) (98% purity) and tetrapropoxysilane (98% purity) was obtained from Gelest, Inc (Tullytown, Pa.). Tetrakis (2-ethylbutoxysilane) (TKEBS) was synthesized in the lab by adopting Von Ebelman's synthesis for tetraalkoxysilanes. Stoichiometric quantities of silicon tetrachloride (semiconductor grade, Aldrich Co.) were reacted with a slight excess of 2-ethylbutyl alcohol, in the presence of pyridine as an acid acceptor in benzene solvent. The products were vacuum distilled to yield approximately 95% pure TKEBS. The above compounds were used as both culture substrates and in the preparation of analytical standards. Glacial acetic acid (Mallinckrodt, Inc., 99.5%), sodium butyrate (Fisher Scientific Co.) and 2-ethylbutyric acid (Aldrich Chemical Co., 97%) were used in the preparation of analytical standards. $H_3PO_4$ (Mallinckrodt, Inc., 95%) was used to prepare 8M aqueous solutions to preserve liquid samples.

Analysis of TBOS, TKEBS, and the Alcohols

TBOS, TKEBS, 1-butanol, and 2-ethylbutanol concentrations were quantitatively determined by liquid-liquid extraction of 1-mL aqueous samples with 0.5 mL of dichloromethane and agitation for five minutes on a vortex mixer. After complete separation of the two immiscible phases, 2 $\mu$L of the dichloromethane extract was introduced into a GC/MS. Analyte concentrations in the extract samples were determined with a HP-5890 gas chromatograph connected to a HP-5971 mass selective detector. The chromatographic separation was carried out with a Rtx-20 column (30 m×0.25 mm, 1.0 $\mu$m film) from Restek, Inc. (Bellefonte, Pa.). The mass spectrometer was operated in the selective ion monitoring (SIM) mode for the quantitative analysis of the compounds. The ions monitored were m/z 56 for 1-butanol, m/z 70 for 2-ethylbutanol, m/z 235 for tetrapropoxysilane (internal standard), m/z 277 for TBOS and m/z 361 for TKEBS. The concentrations were normalized with tetrapropoxysilane (10 mg/L) as an internal standard. Solid Phase Micro Extraction (SPME) (see, e.g., Arthur, et al., Anal. Chem., 64, 1960–1966 (1992) and Zhang, et al., Analytical Chemistry-Report, 66, 844A–853A (1994)) was used for the qualitative analysis of the groundwater and microcosm samples to obtain qualitative information on the nature of contamination at the site. An 85-$\mu$m polyacrylate fiber (Supelco Inc., Belefonte, Pa.) was employed for the SPME extraction performed on 1-mL aqueous samples.

Ultra-pure helium gas (99.999%) was used as the carrier gas (40 psi at tank regulator). The following GC operating conditions were used: injector temperature, 250° C.; detector temperature, 280° C.; the column was initially maintained at 40° C. for 3 minutes and then heated to 70° C. at 10° C./minute followed by another ramp of 40° C./minute to 250° C. and was held at 250° C. for 5 minutes. The column was operated in the splitless mode for the first 3 minutes following which it was operated at a 10:1 split ratio. The mass spectrometer was operated in the selective ion monitoring (SIM) mode for the quantitative analysis of the compounds.

Analysis of Chlorinated Ethenes (TCE and c-DCE)

Gas phase TCE and cis-DCE concentrations were measured by injecting 10–100 $\mu$L of a gaseous sample into a HP-5890 gas chromatograph connected to a photoionization detector (PID) followed by a flame ionization detector (FID). Chromatographic separation was carried-out with a 30-m megabore GSQ-PLOT column from J&W Scientific (Folsom, Calif.). The GC operating conditions were as follows: injector temperature, 250° C.; detector temperature, 280° C.; the column was initially maintained at 40° C. for 2 minutes and then heated to 220° C. at 15° C./minute.

Analysis of Oxygen, Hydrogen, Carbon dioxide and Methane

The gases $N_2$, $H_2$, $CH_4$, $O_2$ and $CO_2$ in the microcosm headspace were measured with a HP-5890 gas chromatograph connected to a thermal conductivity detector. The method involved direct injection of a 0.1-mL gas sample from the headspace of the microcosm into the GC using a gas-tight syringe (Hamilton Co., Reno, Nev.). Chromatographic separation was carried out with a CARBOXEN 1000 packed column (15 ft×0.125 in, S.S Support) from Supelco (Bellefonte, Pa.). The following GC operating conditions were used: injector temperature, 275° C.; detector temperature, 275° C.; the column was initially maintained at 50° C. for 4 minutes and then heated to 51° C. at 0.5° C./minute followed by a ramp of 32° C./minute to 115° C. and immediately another ramp of 20° C./minute to 225° C. and was held at 225° C. for 2.5 minutes. Argon was used as the carrier gas. The method was calibrated by preparing external standards of the gases using a mass flow controller.

Analysis of Volatile Organic Acids

The volatile acids were measured by injecting 0.5–2 $\mu$L of acidified and pre-filtered aqueous samples into a HP-5890 gas chromatograph connected to a FID detector. Chromatographic separation was carried out with a HP-Innowax column (30 m×0.25 mm, 1.0 $\mu$m film) from Hewlett-Packard (Wilmington, Del.). Samples were preserved by adding 10 $\mu$L of 8M $H_3PO_4$ acid to 0.5 mL aqueous solution and was centrifuged prior to analysis.

Example 1

Abiotic and Biological Transformations of Tetraalkoxysilanes

A. Experimental

1. Abiotic Hydrolysis

Abiotic hydrolysis studies were conducted in 250 mL media bottles with butyl rubber septa and rubber lined screw caps (Wheaton Ind., Seattle, Wash.). The matrix used for the experiments were pH buffered solutions made by combining varying quantities of $NaHPO_4$ and $KH_2PO_4$ to provide for the necessary pH. The matrix was then sterilized by chemical poisoning using mercuric chloride. The pH was again adjusted to the desired values using 1N NaOH.

2. Aerobic Biodegradation Microcosms

The microcosms (batch reactors containing active microorganisms) for aerobic biodegradation studies were carried out using 250 mL media bottles (total capacity was 311 mL). The aqueous matrix was a buffer medium designed to maintain a constant pH 7. The buffer medium was prepared by combining the following mineral salts to a liter of deionized water: $KH_2PO_4$, 12 g; $Na_2HPO_4$, 20 g; and adjusting the pH to 7 by using 6M NaOH. The nutrient medium used was prepared by combining concentrated stock solutions of major nutrients with a concentrated stock of trace nutrients at a 10:1 ratio. The following components made up the major nutrient stock solution: $NaNO_3$, 9 g; $MgSO_4$, 0.5 g; and 1 L water and the minor nutrient stock included the following: $ZnSO_4.H_2O$, 0.303 g; $FeSO_4.7H_2O$, 1.2 g; $CoSO_4.7H_2O$, 0.102 g; $MnSO_4.H_2O$, 0.302 g; and 100 mL of deionized water. The sterile controls were prepared by both autoclaving and chemical poisoning. Mercuric chloride ($HgCl_2$) at a concentration of 22 ppm was used as a chemical poison.

The microcosms were prepared by autoclaving 250 mL media bottles with butyl rubber septa and rubber lined screw caps (Wheaton Ind.). Aseptic conditions were maintained by autoclaving all implements used for construction of the microcosm and by constructing the microcosm under a laminar flow hood. Autoclaved synthetic buffered medium (198 mL) and nutrient mixture (2 mL) were added to the microcosms which were then tightly sealed. The remaining 111 mL of headspace was purged with helium to remove air and then 22 mL of pure oxygen was added. This was done for facilitating accurate measurement of oxygen due to incomplete separation of $O_2$ and $N_2$ by the GC column.

3. Enrichment of Aerobic Culture

The microbial culture used for the aerobic biodegradation studies and the cometabolism experiments was stimulated from activated aerobic sludge obtained from the wastewater treatment plant in Corvallis, Oregon. A 2-mL suspension of aerobic activated sludge was acclimated to high concentrations of TBOS (500 mg/L) in a 125-mL microcosm for a period of over 10 months before the stimulation of the culture occurred. This microbial culture was enriched by repeatedly centrifuging the cells and transferring into a different microcosm with buffered medium and growing them on TBOS. The enriched culture was subsequently used as an inoculum for a 2-L (liquid volume) continuous-feed batch reactor that was continuously fed TBOS. The reactor was operated with the same matrix as described for the microcosms. Every day 200 mL was wasted from the reactor and 200 mL of fresh buffer medium and nutrients were added. The mean cell residence time in the reactor was approximately 5 days. The microbial culture from this reactor was ultimately used for the subsequent experiments.

4. Indigenous Microorganisms

Indigenous microorganisms in groundwater at Lawrence Livermore Laboratory, California (Site 300) were stimulated to grow using 2-ethylbutanol and incubate at 30° C. They were then centrifuged, collected, and transferred to a media bottle with buffered medium to form a microcosm.

B. Results

1. Abiotic Hydrolysis

The abiotic transformation of TBOS to 1-butanol and TKEBS to 2-ethylbutanol under conditions of varying pH, temperature, and concentration was studied.

Effect of pH. The effect of pH on the hydrolysis of TBOS and TKEBS at 30° C. and 10 mg/L aqueous concentration was evaluated. The transformation of TBOS was dependent on pH. Faster rates of transformation were observed at pH of 5 and 9, as compared to pH 7. Transformation was faster in site groundwater, pH 7.8, as compared to pH 7. The rate of accumulation of 1-butanol correlated well with the hydrolysis of TBOS. The amount of 1-butanol formed agrees well with the amount of TBOS hydrolyzed with the rate being 4 moles of 1-butanol per mole of TBOS. The results also indicated that 1-butanol was the main product of TBOS hydrolysis. TKEBS was shown to hydrolyze at a much slower rate than TBOS with 2-ethylbutanol as the main product formed. The formation of 2-ethylbutanol was the confirmation of the hydrolysis of TKEBS.

Effect of Temperature. The effect of temperature on the hydrolysis of TBOS and TKEBS at constant pH 7 and 10 mg/L aqueous concentration was studied. The temperature effect was demonstrated by conducting the abiotic hydrolysis experiments at two different temperatures, 15° C. and 30° C. Very little increase was noted over the temperature range studied (15–30° C.). This result suggested that the rate of transformation was controlled by processes other than the transformation itself. Since the solubility of TBOS is very low, a controlling factor is believed to be the rate of TBOS release into solution.

Effect of Concentration. The kinetics of TBOS and TKEBS hydrolysis under varying concentrations above the solubility of the compounds were studied. The hydrolysis of TBOS and TKEBS and the subsequent production of their transformation products were monitored. At pH 7 and 30° C., a ten-fold increase in concentration of TBOS from 10 mg/L to 100 mg/L resulted in a factor of 4 increase in rate. Similarly for TKEBS a ten-fold increase resulted in an increase in the rate of hydrolysis by a factor of 10.

A summary of the rates of hydrolysis under the different conditions studied is listed in Table 3. The rates of hydrolysis for a linear regression fit model are presented. The rates for TBOS were calculated based on the rate of disappearance of TBOS and the formation of 1-butanol. The rates for TKEBS were calculated based only on the rate of formation of 2-ethylbutanol (due to low precision of TKEBS measurement).

should be noted that all concentrations at which the studies were conducted were above the solubility limit.

2. Biological Degradation of TBOS and TKEBS

The biological degradation of TBOS was studied using both indigenous microorganisms and the enriched culture described above. The results of mineralization experiments performed with this new enriched culture indicated that TBOS degradation was much faster in the presence of the enriched TBOS utilizing culture, compared to the mercury poisoned control. Within 30 days, three additions of 100 mg/L of TBOS were utilized in the biologically active culture, while the poisoned control has only hydrolyzed to a very small fraction of the first addition. The 1-butanol that formed was shown to be actively utilized in the biologically active culture, while 1-butanol accumulated in the poisoned control. These results demonstrate the microbially accelerated hydrolysis of TBOS and the potential aerobic metabolism of TBOS. The oxygen consumption data and the carbon dioxide production data were consistent with the TBOS utilization and 1-butanol formation and disappearance. The results indicated that TBOS was completely mineralized to carbon dioxide under aerobic conditions. The moles of $CO_2$ produced were estimated from the gas phase $CO_2$ concentration by assuming Henry's Law equilibrium with the aqueous phase and the equilibrium speciation of $CO_2$ in solution. The equilibrium speciation of $CO_2$ between $H_2CO_3$, $HCO_3^-$, and $CO_3^{2-}$ was based on the measured pH of the aqueous phase. Approximately 600 μmoles of $CO_2$ were produced with each addition of TBOS. Sixteen moles of $CO_2$ were expected for each mole of TBOS degraded. The average ratio observed in the microcosm was 10 moles of $CO_2$ per mole of TBOS. This result indicated the incorporation of carbon from TBOS into cell mass during the course of these experiments.

Similar experiments utilizing the enriched culture from the activated sludge have been conducted with TKEBS. The data analysis for the observations indicate that complete biological degradation occurred.

TABLE 3

Rates of Hydrolysis of TBOS and TKEBS

| Environmental Variables | | | Rates of Hydrolysis in (μmol/day) | | | |
| --- | --- | --- | --- | --- | --- | --- |
| | | | Based on | Based on | Based on | Based on |
| pH | Temp (° C.) | Conc (mg/L) | TBOS degradation | 1-butanol production | TKEBS degradation | 2-ethyl-butanol production |
| 5.0 | 30 | 10 | −0.160 | 0.19 | N.P | 0.023 |
| 9.0 | 30 | 10 | −0.151 | 0.22 | N.P | 0.022 |
| 7.8 | 30 | 10 | −0.110 | 0.16 | N.P | 0.011 |
| 7.0 | 30 | 10 | −0.062 | 0.08 | N.P | 0.012 |
| 7.0 | 15 | 10 | −0.060 | 0.08 | N.P | 0.011 |
| 7.0 | 30 | 100 | −0.208 | 0.26 | N.P | 0.105 |

N.P - low precision giving misleading results

The rates for TBOS transformation at pH 5 and pH 9 increased by a factor of two when compared to pH 7. The rate of TKEBS transformation was about an order of magnitude lower than TBOS. It is believed that the branching of the butoxy group might have a significant effect in decreasing the rates of transformation of TKEBS.

An indication of the rate of mass transfer, or access to TBOS as controlling the rate of transformation, is indicated by the effect of TBOS concentration on the zero order rate of transformation. Higher TBOS concentration resulted in higher rates as indicated by the 1-butanol release data. It 3. Biodegradation of Alkoxysilanes Under Anaerobic Conditions Biodegradation experiments under anaerobic conditions were carried out using microcosms containing microorganisms indigenous to Lawrence Livermore Laboratory (Site 300). The microcosm was turned anoxic by removing oxygen. Initial data suggested that anaerobic degradation follows a pathway shown in Scheme 4.

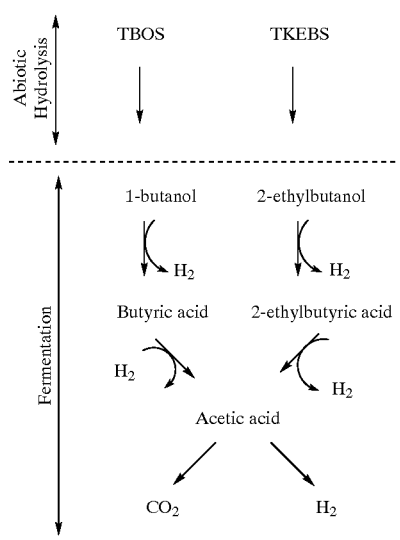

Scheme 4
Anaerobic Transformation
Pathway for TBOS and TKEBS

This pathway indicates abiotic hydrolysis of TBOS and TKEBS to 1-butanol and 2-ethylbutanol, respectively. These alcohols are further fermented to lower chain fatty acids as indicated in Scheme 4. The ultimate fate of the alkoxysilanes under anaerobic conditions as proposed is the formation of hydrogen and carbon dioxide.

C. Discussion

The transformation of alkoxysilanes takes place under both biotic and abiotic conditions. The abiotic hydrolysis of TBOS and TKEBS to the corresponding alcohols under environmental conditions indicated a natural transformation pathway for these compounds. The effect of pH on the hydrolysis showed that the hydrolysis reaction was both acid and base catalyzed. The decrease in hydrolysis rates between TBOS and TKEBS could be attributed to the branching of the alkoxy group and hence a steric hindrance effect. TKEBS hydrolysis was not substantially affected by change in pH (within 5 to 9) which again can be attributed to the steric hindrance. The hydrolysis showed very little temperature dependence. At increased concentrations of TBOS and TKEBS above the solubility limit, increased hydrolysis with concentration was observed. The observation might be related to a surface area effect (the size of TBOS and TKEBS droplets in the emulsion) or could be due to hydrolysis occurring directly at the TBOS/water interface, although the influence of the rate of dissolution of TBOS and TKEBS into solution may be significant.

The biological degradation experiments under aerobic conditions demonstrated the presence of microorganisms that can directly transform TBOS and TKEBS and provides for an efficient mechanism for TBOS and TKEBS clean up. The aerobic experiments indicated almost complete mineralization of TBOS and TKEBS.

Example 2

Aerobic Cometabolism of Chlorinated Ethenes by TBOS Degraders

A. Experimental

The microcosms for aerobic cometabolism studies were carried out as described in Example 1 under the heading "Aerobic Biodegradation." The bacterial culture used was that described in Example 1 under the heading "Enrichment of Aerobic Culture." cis-DCE and TCE stocks in water were prepared by saturating distilled water with cis-DCE and TCE at 30° C. TCE and cis-DCE dissolved in the water to their solubility limit. The aqueous phase from these stocks was then added to the microcosms to yield the required concentrations (0.8 mg/L for TCE and 2 mg/L for cis-DCE). TBOS was introduced into the microcosms by injecting pure TBOS liquid using a microliter syringe.

B. Results

1. TCE Transformation by Microorganisms Grown on TBOS

Figure 6A:
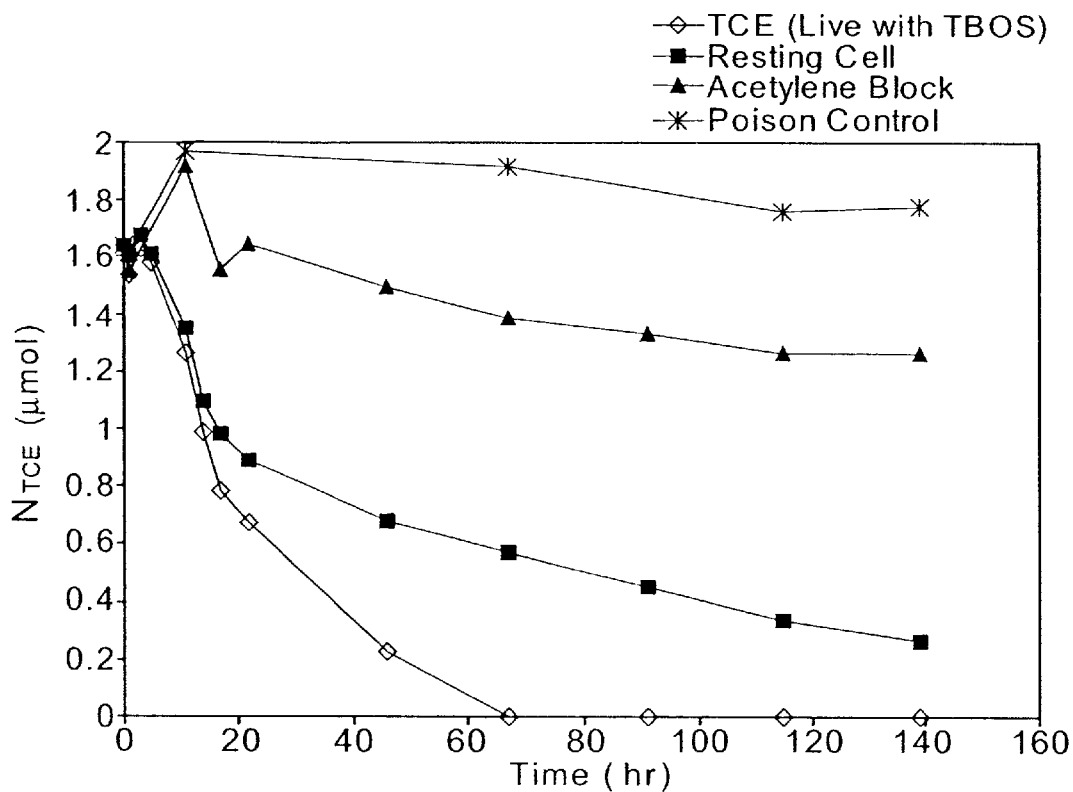
FIG. 6 are graphs of the concentration of TCE (a) and tetrabutyl orthosilicate (TBOS) (b) showing TBOS supporting the aerobic cometabolism of TCE.
Figure 6B:
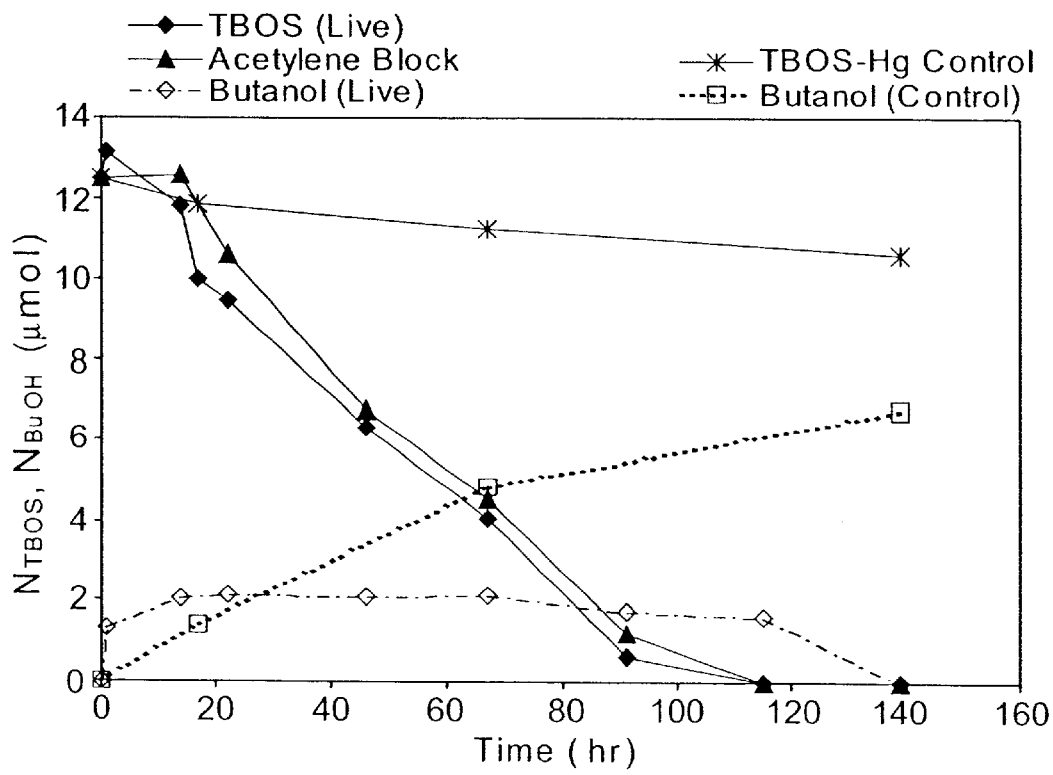

Microbial culture from the wastewater treatment plant of Corvallis, Oregon grown on TBOS was tested for its ability to cometabolize TCE and cis-DCE. Microcosms were constructed with 4.0 mg (dry weight) of culture enriched from a continuous-feed batch reactor according to the procedure described in Example 1. Three microcosms and a control were evaluated: a poisoned control (i.e., a killed microcosm) with TBOS and TCE; a biologically active microcosm with TBOS and TCE; and a resting cell microcosm with only TCE; and an acetylene block microcosm with TBOS and TCE (having acetylene in the head space). The acetylene block experiment was used to investigate the presence of a monooxygenase enzyme. The results of the experiments are as shown in FIG. 6.

In the microcosm with TBOS added, TCE (0.89 mg/L, 1.6 $\mu$mol) was completely cometabolized by the microbial culture within 65 hours. TBOS (20 mg/L, 12 $\mu$mol) was completely degraded. TCE transformation was completed before TBOS was completely degraded. The resting cells (no TBOS added) showed some TCE cometabolism but about 15–20% less than that achieved with TBOS addition. No TCE transformation was observed in the poisoned control. The results indicated that the degradation of TBOS helps drive TCE cometabolism. In the acetylene-blocked microcosm, TCE transformation was significantly reduced (about 20% in 140 hours) but TBOS degradation was not inhibited by the presence of acetylene. This suggests that different enzymes are responsible for the degradation of TBOS and the cometabolism of TCE.

2. cis-DCE Transformation by Microorganisms Grown on TBOS

Figure 7A:
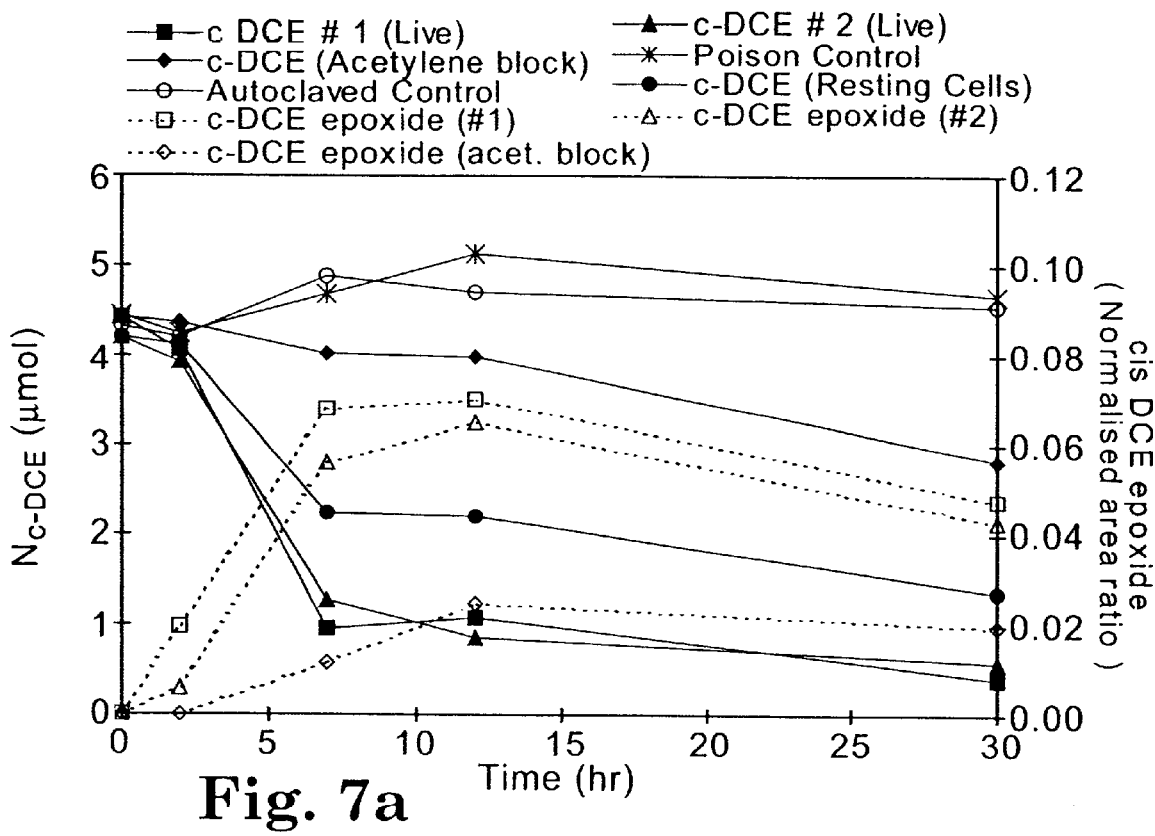
FIG. 7 are graphs of the concentration of cis-DCE (a) and TBOS (b) showing TBOS supporting aerobic cometabolism of cis-DCE.
Figure 7B:
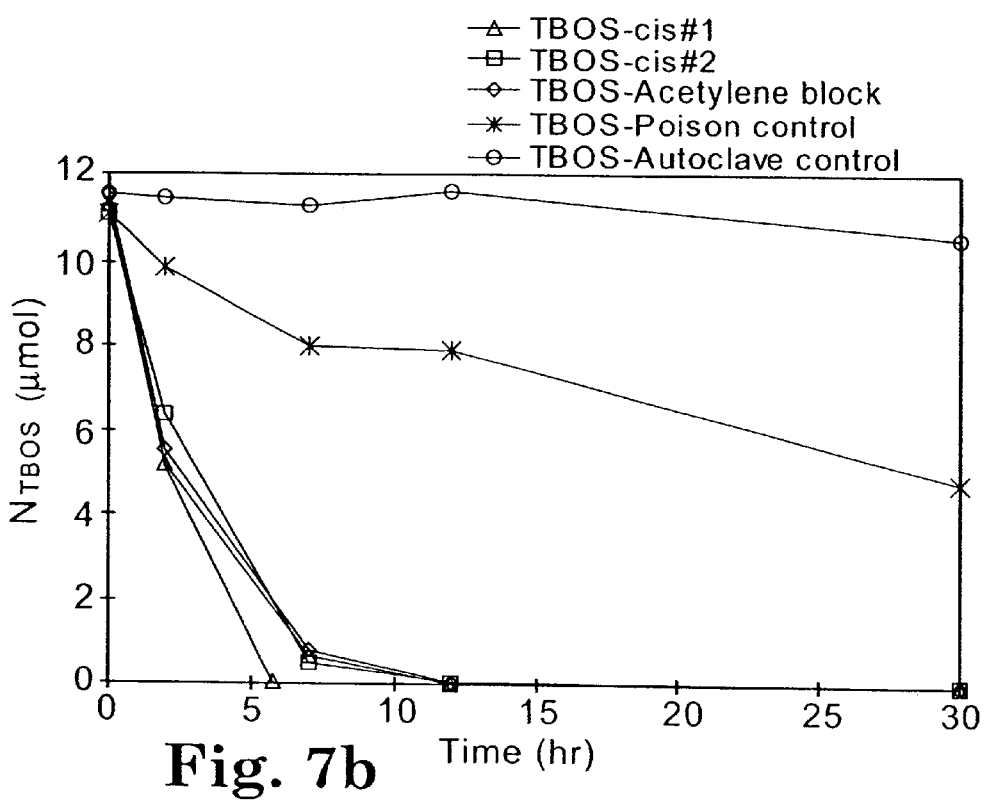

The microbial culture grown on TBOS was tested for its ability to cometabolize cis-DCE. Microcosms were constructed with 9.0 mg (dry cell weight) of enriched culture from a continuous-feed batch reactor. Four microcosms and two controls were evaluated: a poisoned control with TBOS and cis-DCE; an autoclaved control with TBOS and cis-DCE; two biologically active microcosms with TBOS and cis-DCE; a resting cell microcosm with only cis-DCE; and an acetylene block microcosm with TBOS and cis-DCE. The results of the experiments are as shown in FIG. 7.

In the biologically active microcosms (in duplicate), TBOS and cis-DCE degraded rapidly. TBOS and cis-DCE at aqueous concentrations of 20 mg/L and 2 mg/L, respectively, were transformed within 15 hours of incubation. cis-DCE was transformed to an unstable intermediate, cis-DCE epoxide. The increase in concentration of cis-DCE epoxide correlated well with the decrease in cis-DCE concentration. cis-DCE was subsequently transformed at a slow rate. The rate of cis-DCE epoxide transformation with a half-life of about 35 hours was slightly lower than the abiotic transformation rates (half-life of 70 hours). This is consistent with cis-DCE cometabolism stopping after about 12 hours. Thus, the biotic transformation of the epoxide is minimal.

Also in this case cis-DCE cometabolism appears to be highly correlated with TBOS utilization.

Complete transformation of TBOS was observed in the acetylene-blocked microcosm while the presence of acetylene significantly reduced the cis-DCE transformation, and the corresponding production of the epoxide. No cis-DCE transformation occurred in the autoclaved and the poison control microcosm. The resting cell microcosm also exhibited an inherent capacity to degrade cis-DCE. The rate of cis-DCE transformation in this microcosm was less than that observed with TBOS addition. No cis-DCE transformation was observed when acetylene was added to the resting cells (data not shown). These results suggest that TBOS or a product from TBOS transformation induces cis-DCE cometabolism.

Example 3

Reductive Dechlorination of TCE by TKEBS

A. Experimental

TCE Dechlorination Experiments

In initial studies, groundwater from Lawrence Livermore Laboratory(Site 300, D3 Well) was used to make up six different microcosms. Two of these microcosms were sterilized to form controls, one by the addition of mercuric chloride and the other by autoclaving. Two microcosms were amended with sodium benzoate (200 mg/L) as an additional carbon source and the last two were left untouched.

Later experiments were carried out to re-evaluate the anaerobic TCE transformation rates driven by TKEBS transformation. The culture used for these biodegradation studies were indigenous microorganisms stimulated from the groundwater (as described in Example 1) collected from the same site initially studied. The anaerobic biodegradation studies were carried out using 1L media bottles. The microcosms were prepared in an anaerobic glove box and then purged using treated (to remove oxygen) nitrogen to remove the hydrogen and carbon dioxide introduced into the microcosms from the glove box.

B. Results

Initially, the anaerobic transformation via reductive dechlorination of TCE was monitored in 125 mL serum bottles. The results of these initial experiments demonstrated the complete transformation of TCE to cis-DCE in microcosms constructed with groundwater. Duplicate groundwater microcosms without any external substrate addition exhibited dechlorination much earlier as compared to the sodium benzoate amended microcosms. This indicated the presence of an efficient and effective anaerobic substrate in the groundwater. The qualitative and quantitative analysis of the groundwater microcosms and the corresponding controls established the presence of TKEBS and 2-ethylbutanol. The mercuric chloride poisoned microcosms for these tests showed the accumulation of 2-ethylbutanol formed from the hydrolysis of TKEBS while the biologically active microcosms showed no 2-ethylbutanol. This study provided good evidence that TCE transformation was driven by the hydrolysis product of TKEBS.

Additional studies were performed on microcosms constructed using groundwater collected from the same site during the months of January and September 1997. The initial background contaminant concentrations of the groundwater are listed in Table 4.

TABLE 4

Background Contaminant Concentrations

| Compound | Concentration range in September 1997 | Concentration range in January 1997 |
| --- | --- | --- |
| TCE | 5–10 mg/L | 45–60 mg/L |
| Cis-DCE | 150–250 mg/L | 10–15 mg/L |
| TKEBS | 2–5 mg/L | 10–15 mg/L |
| 2-Ethylbutanol | 150–200 mg/L | 5–8 mg/L |
| 2-Ethylbutyric acid | 300–400 mg/L | 50–60 mg/L |
| Acetic acid | 40–60 mg/L | 30–40 mg/L |

The groundwater was purged with treated nitrogen to remove all traces of TCE and cis-DCE prior to re-injection of TCE. Pure TCE was added to obtain concentrations of 100 mg/L(aqueous). The experiments with groundwater sampled in September '97 were conducted in triplicate while the one constructed with groundwater sampled in January '97 was a single microcosm. The microcosms were incubated at 30° C. The microcosms were analyzed for chlorinated ethenes, hydrogen, carbon dioxide, alcohols, and their fermentation products.

Figure 8:
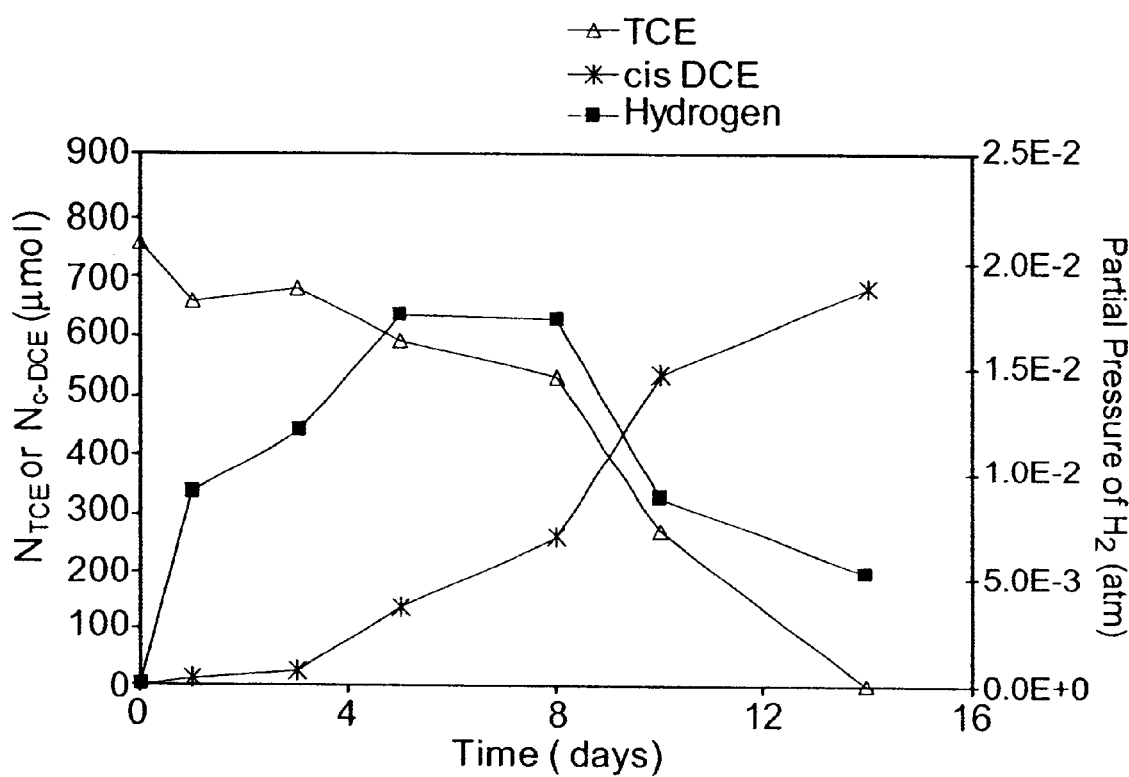
FIG. 8 is a graph of the concentrations of cis-DCE, TCE, and hydrogen partial pressure over time in a groundwater microcosm containing tetrakis(2-ethybutoxy) silane (TKEBS).

The results from September '97 showed that TCE at very high concentrations of 100 mg/L were rapidly dechlorinated to cis-DCE in a matter of 14 days. The data is shown in FIG. 8. Stoichiometric amounts of cis-DCE were formed from the dechlorination of TCE. Large amounts of hydrogen were observed, which was believed to be resulting from a fermentation process. The amounts of hydrogen evolved and consumed during the dechlorination indicated an extremely efficient process. The fermentation of 2-ethylbutanol to 2-ethylbutyric acid and acetic acid was observed. Trace amounts of propionic and butyric acid were detected. The analysis also suggested that the hydrogen production could be correlated to the fermentation of 2-ethylbutanol to 2-ethylbutyric acid and subsequently to acetic acid. A relatively small change in concentration of 2-ethylbutyric acid suggested that the rate of production of 2-ethylbutyric acid was similar to its rate of fermentation to acetic acid.

C. Discussion

The reductive dechlorination of TCE observed in these microcosm studies demonstrate the remediation occurring in the site tested was driven by TKEBS. The dechlorination of very high concentrations of TCE (100 mg/L aqueous concentration) to cis-DCE and the high efficiency of electron donor utilization observed indicates a very effective dechlorinating mechanism.

Analysis of experiments with groundwater obtained in January '97 indicated the presence of low amounts of 2-ethylbutanol and its fermentation products. The hydrogen evolution in these microcosms were low and was shown to be driving TCE transformation at slow rates. The hydrogen evolved was efficiently directed towards dechlorination. The efficiency could be attributed to the slow delivery of hydrogen for dechlorinating microorganisms to out compete the methanogens, i.e., hydrogen was produced at very low levels from the fermentation reaction and was directed towards dechlorination rather than making methane through methanogenesis.

Analysis of the groundwater obtained in September '97 from the same site indicated that the TKEBS had hydrolyzed to substantial amounts of 2-ethylbutanol, which was being fermented to their corresponding acids and producing high levels of hydrogen. The presence of large amounts of the alcohol could be due to accelerated hydrolysis of TKEBS during the summer months, when the water table is drawn down, introducing oxygen into the aquifer.

Example 4

Reductive Dechlorination of TCE by TBOS

A. Experimental

Microcosms were constructed in 1.05-L bottles with 750-mL, of groundwater and 200-mL of aquifer solids from Pt. Mugu, California. The microcosm was purged with treated (oxygen-free) nitrogen to remove all background ethenes. TCE was added to obtain aqueous concentrations of 5 mg/L. Pure liquid TBOS to achieve concentrations of 1 g/L were added in order to support both dechlorination and sulfate reduction (the groundwater included a high level of sulfate).

B. Results

Figure 9A:
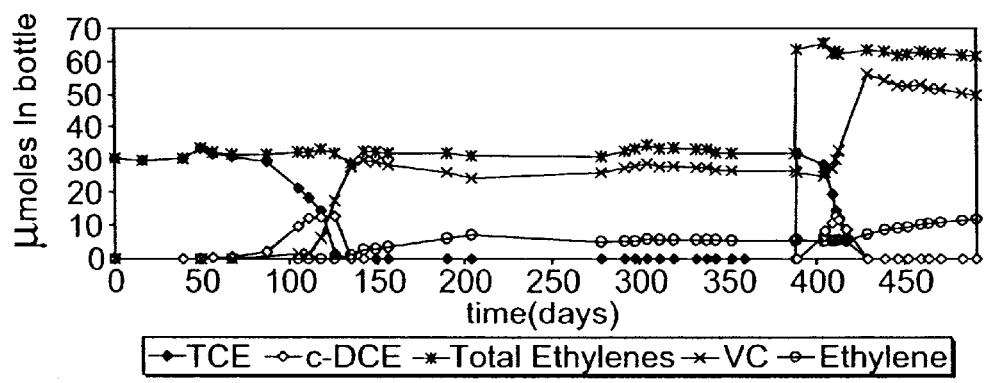
FIG. 9 is a graph of the concentrations of a) TCE, c-DCE, VC, ethylene, and total ethylenes; b) methane and hydrogen; and c) acetate, 1-butanol, and TBOS in a Pt. Mugu microcosm amended with TBOS. The reduction of TCE to ethene is shown resulting from TBOS addition and the resulting fermentation reactions and hydrogen production.
Figure 9B:
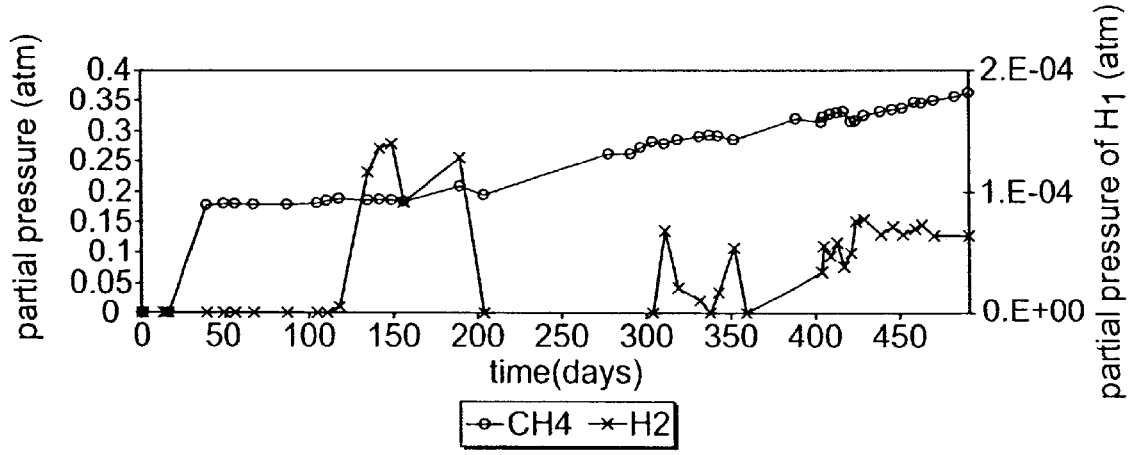
Figure 9C:
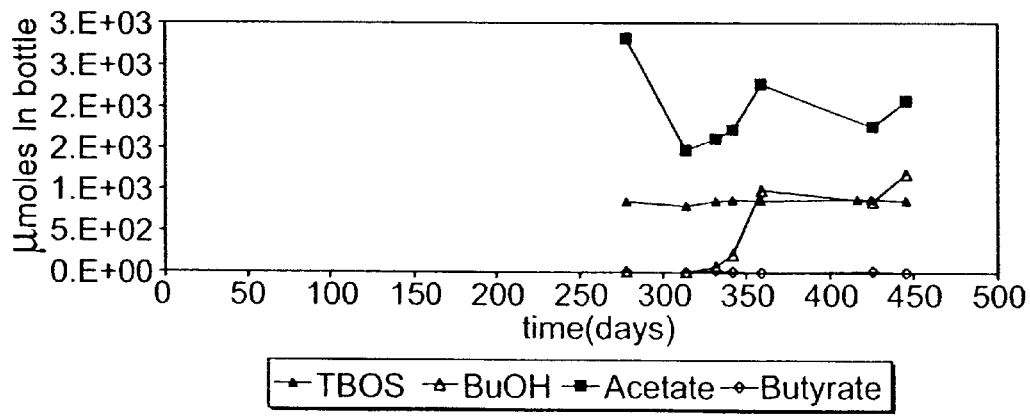

The results of the anaerobic microcosm experiments are shown in FIGS. 9a–9c. After one month of incubation, active methanogenesis was observed, which stopped and remained steady after a period of 40 days. The initial production of methane created excessive pressure in the microcosm and its subsequent release resulted in some loss of TCE from the microcosm.

After a period of 40 days, TCE dechlorination to cis-DCE was observed to occur at a slow rate. After about 90 days, TCE dechlorination rates improved and further dechlorination of cis-DCE to vinyl chloride (VC) was observed. After about 125 days, transformation of VC to ethene began and this transformation occurred at a slow rate.

From the period of 200 to 400 days no further transformation of VC to ethene occurred. At 400 days TCE was again added to the bottle to determine whether dehalogenation activity continued. No other additions where made to the bottle. TCE was rapidly transformed to VC, and upon the addition of TCE, VC transformation to ethen resumed in the microcosm. The results illustrate the long-term transformation of TCE, over 500 days, that resulted from the addition of only TBOS as a substrate to the microcosm at the start of the test.

The long-term production of methane and hydrogen are also shown in the FIG. 9, as a result of the TBOS addition. The results show effective anaerobic conditions are generated through TBOS addition. The acetate, butanol, TBOS concentration are shown over the period of 275 to 450 days. Acetate is produced from the fermentation of butanol (BuOH). Long-term methane and hydrogen production are also shown. The results show TBOS persisting in the microcosm for over 450 days.

C. Discussion

This study provided evidence of reductive dechlorination supported by TBOS, which was added as a slow release source for an electron donor. Initial methanogenesis in this system could be attributed to a burst of 1-butanol resulting from the hydrolysis of high amounts of TBOS. Following utilization of this short-lived burst of 1-butanol, methanogenesis subsided and dechlorination was observed. The dechlorination is supported by 1-butanol that is slowly produced from the hydrolysis of TBOS. The production of hydrogen resulting from the fermentation reactions is demonstrated by the results shown in FIG. 9b.

Example 5

Reductive Dechlorination of TCE by TKEBS and TBOS

A. Experimental

The TCE dechlorination experiments were conducted in the same way as described in Example 3. In these experiments, however, TBOS and TKEBS were amended to samples of the groundwater microcosms.

B. Results

Figure 10A:
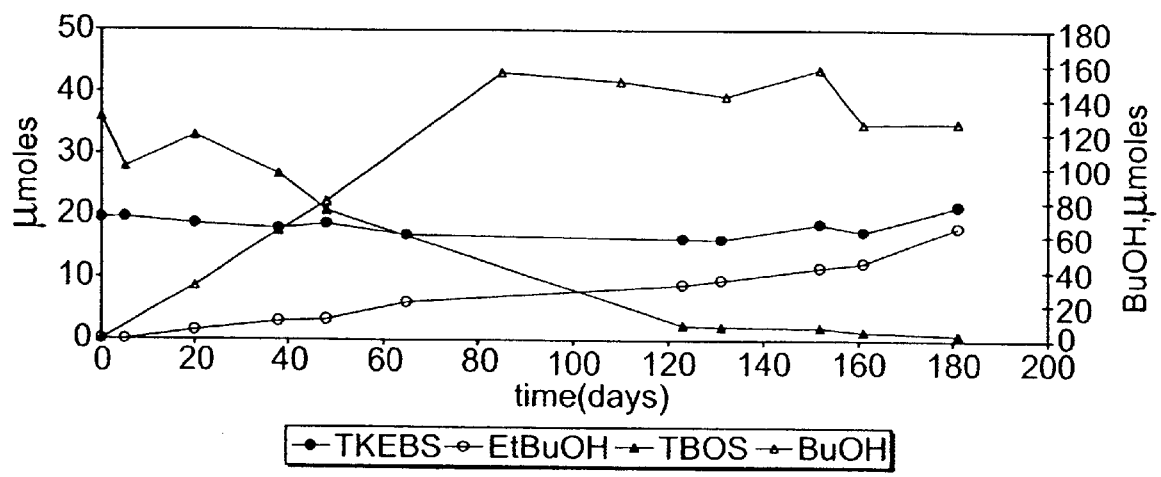
FIG. 10 is a graph of the concentration of a) TKEBS, TBOS, 2-ethylbutanol (EtbuOH), 1-butanol (BuOH); b) acetate, butyrate, ethybutyrate, hydrogen, and c) TCE in a poisoned groundwater microcosm. The results show the hydrolysis of TKEBS and TBOS to 2-ethylbutanol and 1-butanol, and the absence of microbial fermentation reactions.
Figure 10B:
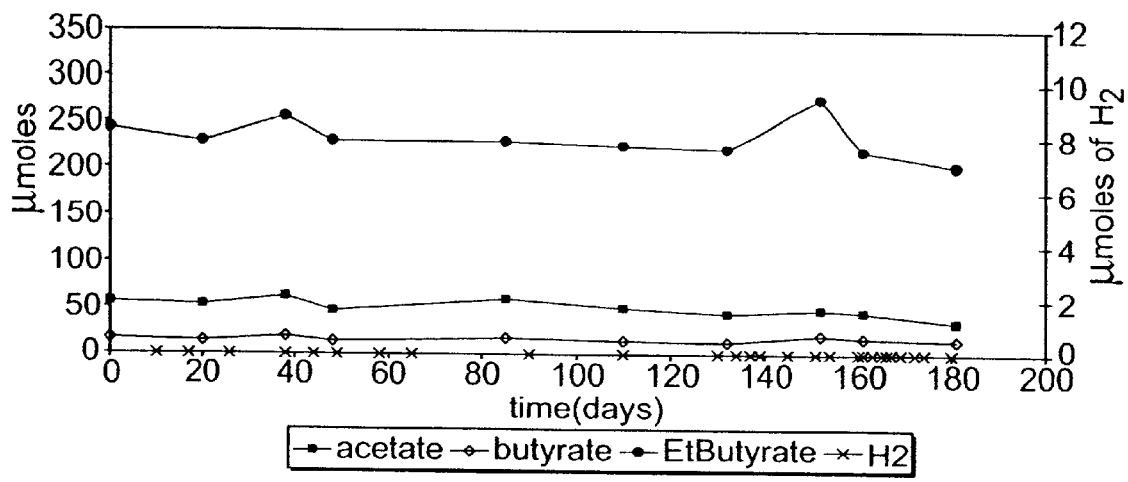
Figure 10C:
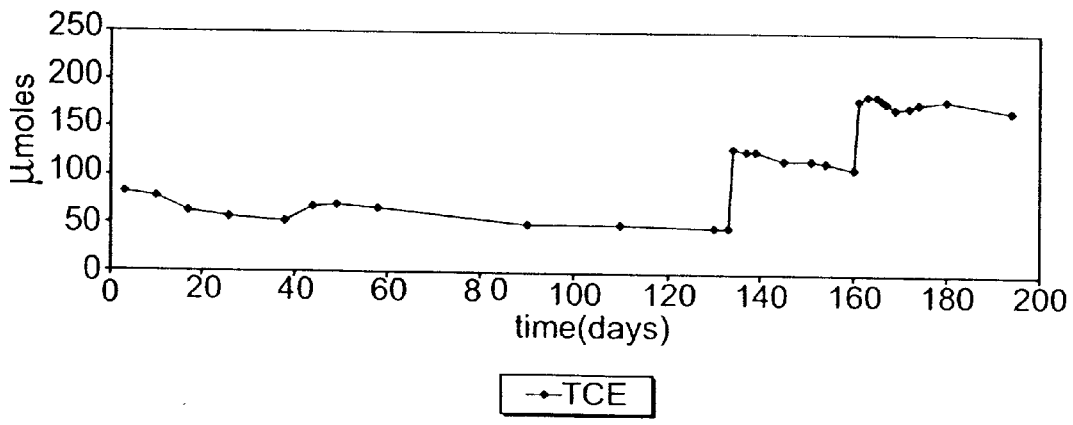

Shown in FIGS. 10a–10c is a groundwater microcosm from Lawrence Livermore Site 300 that was poisoned with mercuric chloride. The groundwater initially contained TKEBS and acetate, and ethylbutyrate as a result of TKEBS transformation in the site groundwater. TBOS was added to the microcosm. The generation of butanol (BuOH) and ethybutanol as a result of the hydrolysis of TKEBS and TBOS is shown. Ethybutanol is slowly formed, while butanol is more rapidly formed due to its more rapid hydrolysis. No fermentation of butanol is observed, due to the lack of microbial activity as a result of the chemical poisoning. This lack of microbial activity is also indicated by the lack of acetate, ethybutyrate, butyrate, and hydrogen formation. TCE was not transformed in the microcosm. No transformation of TCE to c-DCE was observed in the microcosm.

Figure 11A:
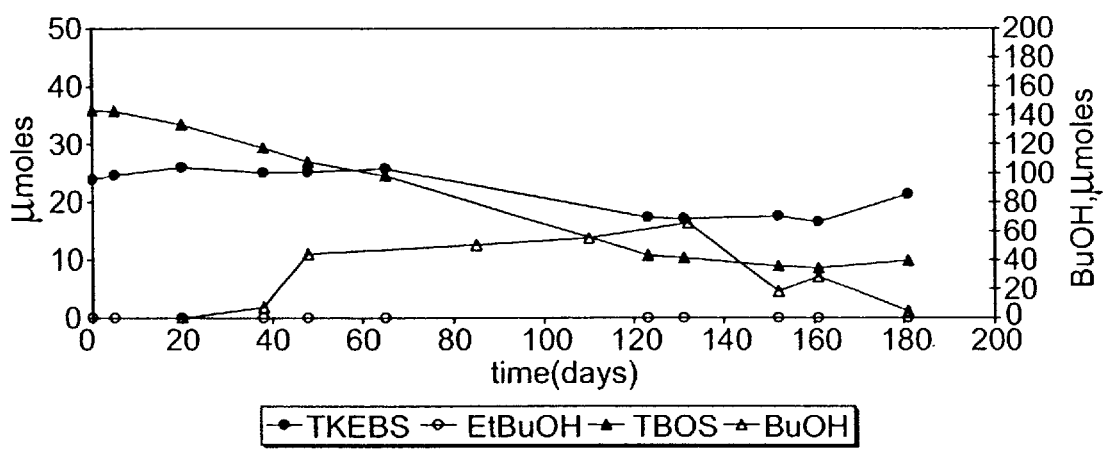
FIG. 11 is a graph of the concentration of a) TKEBS, TBOS, 2-ethylbutanol (EtbuOH), 1-butanol (BuOH); b) acetate, butyrate, ethybutyrate, hydrogen; and c) TCE and c-DCE in a microbially active groundwater microcosm. The results show the hydrolysis of TKEBS and TBOS to 2-ethylbutanol and 1-butanol, the fermnentation to organic acids, the production of hydrogen, and the transformation of TCE to cis-DCE.
Figure 11B:
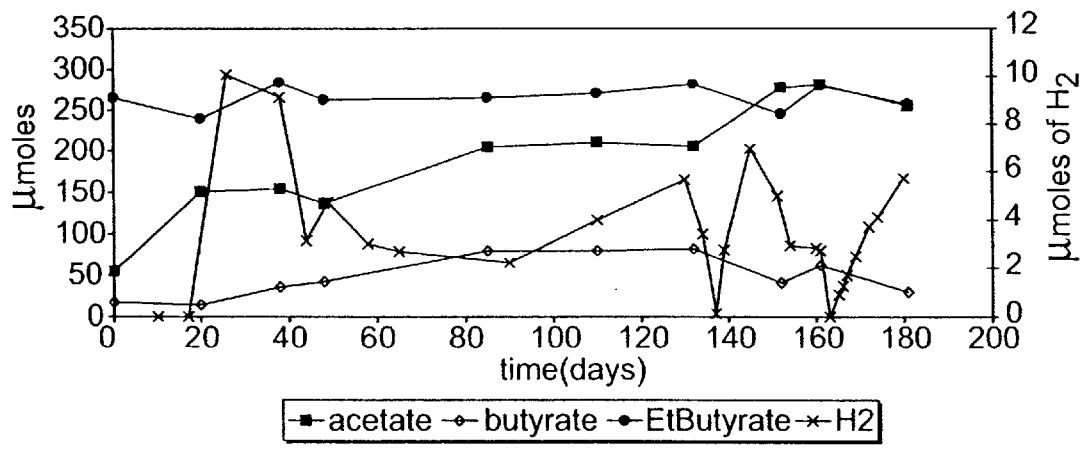
Figure 11C:
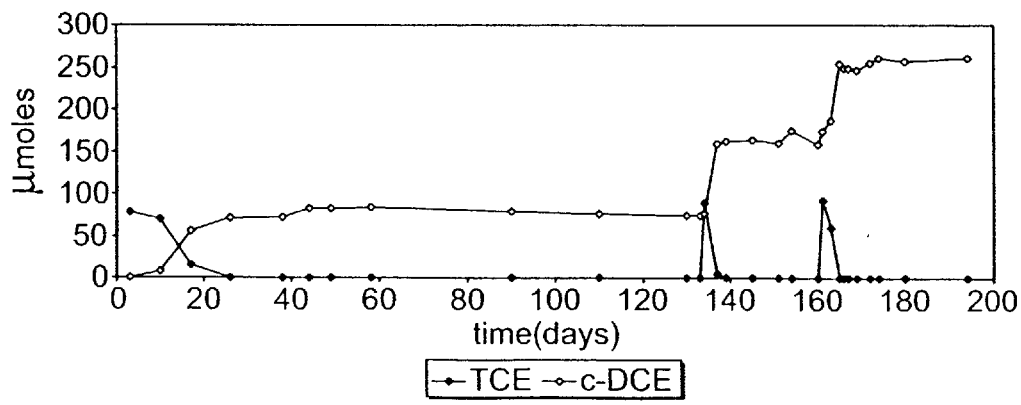

Shown in FIGS. 11a–11c is a microbial active version of a Site 300 microcosm with TBOS and TKEBS added. This microcosm was similar in construct to the poisoned control shown in FIGS. 10a–10c. However in this case both ethybutanol and butanol are utilized, compared to the poisoned control where they accumulated. Acetate, butyrate and hydrogen are produced as a result of fermentation reactions. TCE is shown to be rapidly transformed to c-DCE. Three additions of TCE are transformed at 0, 135, and 160 days, with the corresponding increases in c-DCE occurring. Hydrogen is shown to be utilized upon TCE addition and produced once TCE transformation has stopped. The results indicate TBOS and TKEBS are acting as slow release substrates and the resulting fermentation reactions produce hydrogen that is utilized in dehalogenation reactions for TCE reduction.

The complete disclosures of the patents, patent documents, and publications cited herein are incorporated by reference in their entirety as if each were individually incorporated. Various modifications and alterations to this invention will become apparent to those skilled in the art without departing from the scope and spirit of this invention. It should be understood that this invention is not intended to be unduly limited by the illustrative embodiments and examples set forth herein and that such examples and embodiments are presented by way of example only with the scope of the invention intended to be limited only by the claims set forth herein as follows.

What is claimed is:

1. A bioremediation method of degrading one or more environmental contaminants in a sample containing microorganisms, the method comprising:

determining the presence of the one or more environmental contaminants; and contacting the sample with a liquid or a solid form of at least one slow release compound having at least one hydrolyzable organic group capable of forming at least one alcohol, at least one organic acid, or a combination thereof, upon hydrolysis;

wherein the liquid or solid slow release compound having at least one hydrolyzable organic group is provided in an amount sufficient to form at least one alcohol, at least one organic acid, or a combination thereof, in an amount sufficient for the microorganisms to degrade the one or more environmental contaminants.

2. The bioremediation method of claim 1 wherein the step of determining the presence of the one or more environmental contaminants comprises measuring the initial concentration of a contaminant and monitoring its degradation into transformation products.

3. The bioremediation method of claim 2 wherein the step of monitoring degradation of an environmental contaminant comprises measuring its concentration or the concentration of its transformation products during the degradation of the environmental contaminant.

4. The bioremediation method of claim 1 wherein the environmental contaminant is selected from the group of organic compounds, metals, metal-containing compounds, and mixtures thereof.

5. The bioremediation method of claim 4 wherein the environmental contaminant comprises a halogenated organic compound.

6. The bioremediation method of claim 5 wherein the halogenated organic compound comprises chlorinated hydrocarbons, fluorinated hydrocarbons, chlorofluoro hydrocarbons, or mixtures thereof.

7. The bioremediation method of claim 1 wherein the slow release compound having at least one hydrolyzable organic group is selected from the group of an organometallic compound, an organophosphorus compound, an organic compound, and mixtures thereof.

8. The bioremediation method of claim 7 wherein the slow release compound having at least one hydrolyzable organic group is an organometallic compound.

9. The bioremediation method of claim 8 wherein the organometallic compound having at least one hydrolyzable organic group comprises an organosilicon compound.

10. The bioremediation method of claim 9 wherein the organosilicon compound comprises an organosilane or an organosiloxane.

11. The bioremediation method of claim 10 wherein the organosilicon compound is an organosilane selected from the group of tetrapropoxysilane, tetrabutoxysilane, tetrakis (2-ethylbutoxy) silane, tetraphenoxysilane, silicon tetraacetate, silicon tetrapropionate, silicon tetrabutyrate, silicon tetralactate, silicon tetrabenzoate, silicon tetracrotonoate, tetraallyloxy silane, silicon tetrapyruvate, tetrakis(2-methylbutoxy) silane, tetrakis(1-methylpropoxy) silane, tetrakis(2-methylpropoxy) silane, tetrakis(1-methylethoxy) silane, tetrakis(1-hydroxypropoxy) silane, tetrakis(benzylmethoxy) silane, and combinations thereof.

12. The bioremediation method of claim 11 wherein the organosilicon compound is an organosiloxane selected from the group of hexaethoxydisiloxane, hexapropoxydisiloxane, hexabutoxydisiloxane, hexaphenoxydisiloxane, octaethoxytrisiloxane, and combinations thereof.

13. The bioremediation method of claim 1 which occurs under aerobic conditions, anaerobic conditions, or a combination of anaerobic and aerobic conditions.

14. The bioremediation method of claim 1 wherein the microorganisms comprise anaerobic microorganisms.

15. The bioremediation method of claim 14 wherein the anaerobic microorganisms comprise bacteria selected from the group of methanogens, acetogens, dehalogenators, denitrifiers, and mixtures thereof.

16. The bioremediation method of claim 15 wherein the anaerobic microorganisms comprise dehalogenating bacteria selected from the group of iron reducers, sulfate reducers, manganate reducers, and mixtures thereof.

17. The bioremediation method of claim 14 wherein at least one of the anaerobic microorganisms produces hydrogen.

18. The bioremediation method of claim 1 wherein the microorganisms comprise aerobic microorganisms.

19. The bioremediation method of claim 18 wherein the aerobic microorganisms comprise bacteria that produce or induce enzymes selected from the group of monooxygenases, dioxygenases, hydrolases, and mixtures thereof.

20. The bioremediation method of claim 19 wherein the monooxygenases are selected from the group of methane monooxygenases, propane monooxygenases, butane monooxygenases, and mixtures thereof.

21. The bioremediation method of claim 1 further comprising a step of providing nutrients to support microbial activity.

22. The bioremediation method of claim 21 wherein the nutrients comprise phosphorus- and nitrogen-containing compounds.

23. The bioremediation method of claim 1 which is carried out in situ or ex situ.

24. The bioremediation method of claim 23 wherein the sample containing an environmental contaminant comprises soil, sediment, sludge, water, for combinations thereof.

25. The bioremediation method of claim 24 wherein the sample containing an environmental contaminant comprises groundwater.

26. The bioremediation method of claim 1 wherein the microorganisms are added to the sample containing the environmental contaminant.

27. The bioremediation method of claim 1 wherein the slow release compound having at least one hydrolyzable organic group is in the form of a solid or a liquid.

28. The bioremediation method of claim 1 wherein the slow release compound having at least one hydrolyzable organic group is provided as colloidal particles in water.

29. The bioremediation method of claim 1 wherein the slow release compound having at least one hydrolyzable organic group is attached to a solid support.

30. A bioremediation method of degrading a halogenated organic compound in an environmental sample, the method comprising:
   determining the presence of the halogenated organic compound; and
   contacting the environmental sample with at least one organosilicon compound having at least one hydrolyzable organic group in the presence of at least one type of microorganism.

31. The bioremediation method of claim 30 wherein the halogenated organic compound comprises an unsaturated compound having chlorine substituents, fluorine substituents, or a combination thereof.

32. The bioremediation method of claim 31 wherein the chlorinated unsaturated compound comprises cis-dichlorocthene, vinyl chloride, trichloroethene, tetrachloroethene, or trichlorofluoroethylene.

33. The bioremediation method of claim 30 wherein the organosilicon compound comprises tetrabutoxysilane, tetrakis(2-ethylbutoxysilane), or a combination thereof.

34. The bioremediation method of claim 30 wherein the contacting step comprises injecting an aqueous dispersion of colloidal particles of the organosilicon compound into the environmental sample.

35. The bioremediation method of claim 30 wherein the environmental sample comprises soil, sediment, sludge, water, or mixtures thereof.

36. The bioremediation method of claim 35 wherein the environmental sample comprises a subsurface environment.

37. The bioremediation method of claim 36 wherein the environmental sample comprises groundwater.

38. The bioremediation method of claim 36 wherein the contacting step comprises injecting liquid organosilicon compounds into the subsurface environment using drive-point devices.

39. The bioremediation method of claim 36 wherein the contacting step comprises injecting liquid organosilicon compounds into recirculation wells.

40. The bioremediation method of claim 35 wherein the environmental sample comprises soil in a surface environment and the contacting step comprises mixing the organosilicon compound into the soil.

41. The bioremediation method of claim 30 wherein the environmental sample is contained in a bioreactor.

42. The bioremediation method of claim 41 wherein the bioreactor is selected from the group of fluidized bed reactors, plug flow reactors, batch sequencing reactors, completely stirred tank reactors, granular activated sludge reactors, and combinations thereof.

43. The bioremediation method of claim 30 wherein the contacting step further comprises contacting the environmental sample with at least one microorganism.

44. A kit for bioremediation of an environmental contaminant in a sample comprising at least one type of microorganism, the kit comprising:

at least one slow release compound having at least one hydrolyzable organic group capable of forming at least one alcohol, at least one organic acid, or a combination thereof, upon hydrolysis; and instruction means for applying the compound to the sample.

45. The bioremediation kit of claim 34 further comprising a container that allows slow release of the compound having at least one hydrolyzable organic group, the alcohol or organic acid, or combinations thereof.

46. A bioremediation method of degrading one or more environmental contaminants in a sample containing microorganisms, the method comprising:

determining the presence of the one or more environmental contaminants; and contacting the sample with at least one slow release compound having at least one hydrolyzable organic group capable of forming at least one alcohol, at least one organic acid, or a combination thereof, upon hydrolysis;

wherein the slow release compound having at least one hydrolyzable organic group is selected from the group of an organometallic compound, an organic compound, and mixtures thereof, and is provided in an amount sufficient to form at least one alcohol, at least one organic acid, or a combination thereof, in an amount sufficient for the microorganisms to degrade the one or more environmental contaminants.

47. A bioremediation method of degrading one or more environmental contaminants in a sample containing microorganisms, the method comprising:

determining the presence of the one or more environmental contaminants; and contacting the sample with at least one slow release compound having at least one hydrolyzable organic group capable of forming at least one alcohol, at least one organic acid, or a combination thereof, upon hydrolysis;

wherein the slow release compound having at least one hydrolyzable organic group is an organometallic compound and is provided in an amount sufficient to form at least one alcohol, at least one organic acid, or a combination thereof, in an amount sufficient for the microorganisms to degrade the one or more environmental contaminants.

48. A kit for bioremediation of an environmental contaminant in a sample comprising at least one type of microorganism, the kit comprising:

at least one slow release compound having at least one hydrolyzable organic group capable of forming at least one alcohol, at least one organic acid, or a combination thereof, upon hydrolysis, wherein the slow release compound is selected from the group of an organometallic compound, an organic compound, and mixtures thereof; and instruction means for applying the compound to the sample.

49. The bioremediation kit of claim 48 further comprising a container that allows slow release of the compound having at least one hydrolyzable organic group, the alcohol or organic acid, or combinations thereof.

50. A kit for bioremediation of an environmental contaminant in a sample comprising at least one type of microorganism, the kit comprising:

at least one slow release compound having at least one hydrolyzable organic group capable of forming at least one alcohol, at least one organic acid, or a combination thereof, upon hydrolysis, wherein the slow release compound is a liquid or a solid; and instruction means for applying the liquid or solid compound to the sample.

51. The bioremediation kit of claim 50 further comprising a container that allows slow release of the compound having at least one hydrolyzable organic group, the alcohol or organic acid, or combinations thereof.

* * * * *

UNITED STATES PATENT AND TRADEMARK OFFICE
CERTIFICATE OF CORRECTION

PATENT NO. : 6,472,198 B1 Page 1 of 1
DATED : October 29, 2002
INVENTOR(S) : Semprini et al.

It is certified that error appears in the above-identified patent and that said Letters Patent is hereby corrected as shown below:

Column 1,
Line 46, delete "Cl" and insert -- Cl$^-$ --

Signed and Sealed this

Fourth Day of March, 2003

JAMES E. ROGAN
*Director of the United States Patent and Trademark Office*

UNITED STATES PATENT AND TRADEMARK OFFICE
CERTIFICATE OF CORRECTION

PATENT NO.    : 6,472,198 B1
DATED         : October 29, 2002
INVENTOR(S)   : Semprini et al.

It is certified that error appears in the above-identified patent and that said Letters Patent is hereby corrected as shown below:

Column 1,
Line 6, after "This application claims the benefit of U.S. Provisional Application No. 60/085,690, filed May 15, 1998.", insert -- STATEMENT RE FEDERALLY SPONSORED RESEARCH AND DEVELOPMENT. This invention was made with Government support under subcontract number B332507 awarded by the University of California under the prime contract No. W-7405-ENG-48 with the United States Department of Energy. The Government may have certain rights in this invention. --

Signed and Sealed this

Seventh Day of September, 2004

JON W. DUDAS
*Director of the United States Patent and Trademark Office*